US012450849B2

(12) United States Patent
Rintel et al.

(10) Patent No.: US 12,450,849 B2
(45) Date of Patent: Oct. 21, 2025

(54) COLLABORATIVE SYSTEM

(71) Applicant: Microsoft Technology Licensing, LLC, Redmond, WA (US)

(72) Inventors: Edward Sean Lloyd Rintel, Cambridge (GB); Payod Panda, Cambridge (GB); Lev Tankelevitch, London (GB); Abigail Jane Sellen, Cambridge (GB); Kori Marie Inkpen, Redmond, WA (US); John C. Tang, Palo Alto, CA (US); Sasa Junuzovic, Kirkland, WA (US); Andrew D. Wilson, Seattle, WA (US); Bo Kang, Leamington Spa (GB); Andriana Boudouraki, Nottingham (GB); William Arthur Stewart Buxton, Toronto (CA); Ozumcan Demir Caliskan, London (GB); Kunal Gupta, Prague (CZ)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 18/065,987

(22) Filed: Dec. 14, 2022

(65) Prior Publication Data

US 2024/0203075 A1 Jun. 20, 2024

(51) Int. Cl.
*G06T 19/20* (2011.01)
*G06F 3/16* (2006.01)
(Continued)

(52) U.S. Cl.
CPC .............. *G06T 19/20* (2013.01); *G06F 3/165* (2013.01); *G06T 13/40* (2013.01); *G06T 19/006* (2013.01);
(Continued)

(58) Field of Classification Search
CPC ....... G06T 19/20; G06T 13/40; G06T 19/006; G06T 2200/24; G06T 2219/024;
(Continued)

(56) References Cited

U.S. PATENT DOCUMENTS

| 2014/0098183 | A1* | 4/2014 | Smith | .................. | H04N 9/3185 |
| | | | | | 348/E7.083 |
| 2015/0163454 | A1 | 6/2015 | Smith | | |

(Continued)

FOREIGN PATENT DOCUMENTS

| EP | 2442280 A1 | 4/2012 |
| EP | 3211596 A1 | 8/2017 |

OTHER PUBLICATIONS

"The Most Immersive Enterprise AR Device", Retrieved From: https://web.archive.org/web/20221125085227/https://www.magicleap.com/en-us/, Nov. 25, 2022, 6 Pages.

(Continued)

*Primary Examiner* — Devona E Faulk
*Assistant Examiner* — Donna J. Ricks
(74) *Attorney, Agent, or Firm* — Alleman Hall & Tuttle LLP

(57) ABSTRACT

A computer-implemented method is described which comprises generating a representation of a digital space and a representation of the physical space using an audiovisual feed received from a camera proximate to a display located in the physical space. The representation of the digital space is generated using user information identifying a remote user associated with the display and presence information relating to the remote user and the digital representation comprises an avatar of the remote user. The representation of the digital space is output to the display located in the physical space and the representation of the physical space it output to a computing device associated with the remote user. The (Continued)

method further comprises dynamically updating the representation of the digital space and/or physical space in response to changes in the user information and presence information.

19 Claims, 16 Drawing Sheets

(51) Int. Cl.
*G06T 13/40* (2011.01)
*G06T 19/00* (2011.01)
*H04N 5/262* (2006.01)
*H04N 5/265* (2006.01)

(52) U.S. Cl.
CPC .......... *H04N 5/2628* (2013.01); *H04N 5/265* (2013.01); *G06T 2200/24* (2013.01); *G06T 2219/024* (2013.01); *G06T 2219/2016* (2013.01)

(58) Field of Classification Search
CPC ............ G06T 2219/2016; G06F 3/165; H04N 5/2628; H04N 5/265; H04N 7/147; H04N 7/157
See application file for complete search history.

(56) References Cited

U.S. PATENT DOCUMENTS

| | | | |
|---|---|---|---|
| 2015/0326822 A1 | 11/2015 | Jeong | |
| 2017/0302709 A1* | 10/2017 | Jones | ............ G06Q 10/10 |
| 2018/0124497 A1* | 5/2018 | Boesen | ............ H04W 4/38 |
| 2020/0195889 A1 | 6/2020 | Sakai | |
| 2023/0138733 A1* | 5/2023 | Springer | ............ H04N 7/0135 348/14.08 |
| 2024/0097925 A1* | 3/2024 | Palamadai | ............ H04N 7/152 |
| 2024/0275922 A1* | 8/2024 | Chalmers | ............ H04L 12/1813 |

OTHER PUBLICATIONS

"What Are Augmented Reality and Virtual Reality?", Retrieved From: https://www.splunk.com/en_us/data-insider/what-are-augmented-reality-and-virtual-reality.html, Mar. 1, 2020, 13 Pages.

"Within VR—Cinematic Virtual", Retrieved From: https://play.google.com/store/apps/details?id=com.shakingearthdigital.vrsecardboard&gl=US, Oct. 6, 2020, 3 Pages.

Casman, Jesse, "Stream Real World VR Scenes to Your Headset", Retrieved From: https://www.hackster.io/news/stream-real-world-vr-scenes-to-your-headset-8a78dfedbb3e, Retrieved Date : Jul. 15, 2022, 6 Pages.

Endo, et al., "Cylindrical 3D Display Observable from All Directions", In Proceedings the Eighth Pacific Conference on Computer Graphics and Applications, Oct. 5, 2000, pp. 300-306.

Hermes, "Real Time Streaming within Augmented and Virtual Reality", Retrieved From: https://medium.com/agora-io/sharing-augmented-realities-in-realtime-bfaf9d6f5283, Jun. 14, 2019, 19 Pages.

Lucke, et al., "3D Interactions between Virtual Worlds and Real Life in an E-Learning Community", In Proceedings of Advances in Human-Computer Interaction, May 9, 2011, 12 Pages.

Maeda, et al., "All-Around Display for Video Avatar in Real World", In Proceedings of Second IEEE and ACM International Symposium on Mixed and Augmented Reality, Oct. 10, 2003, 2 Pages.

Maeda, et al., "Real World Video Avatar: Transmission and Presentation of Human Figure", In Proceedings of IEEE Virtual Reality, Mar. 27, 2004, pp. 237-238.

Morignat, et al., "Real Presences Within Virtual Worlds", Retrieved From: https://www.coursehero.com/file/108996869/Real-Presences-Within-Virtual-Worldspdf/, Oct. 3, 2021, 16 Pages.

Ogi, et al., "Immersive Telecommunication Using Stereo Video Avatar", In Proceedings of IEEE Virtual Reality, Mar. 13, 2001, 7 Pages.

Sood, Gaurav, "This Metaverse Streaming Device Connects Virtual World with the Real One", Retrieved From: https://www.yankodesign.com/2022/06/24/this-metaverse-streaming-device-connects-virtual-world-with-the-real-one/, Jun. 24, 2022, 10 Pages.

Sullivan, Mark, "Microsoft is Getting Serious About this Holographic Meetings Thing", Retrieved From: https://www.fastcompany.com/90344912/microsoft-is-getting-serious-about-this-holographic-meetings-thing, Jun. 5, 2019, 10 Pages.

Favalora, et al., "100 Million-Voxel Volumetric Display", In Proceedings of Cockpit Displays IX: Displays for Defense Applications, Aug. 28, 2002, 13 Pages.

"Spatial", Retrieved From: https://www.spatial.io/, Retrieved Date: Jul. 15, 2022, 8 Pages.

International Search Report and Written Opinion received for PCT Application No. PCT/US2023/081053, Mar. 12, 2024, 16 pages.

Jones, et al., "Belonging there: VROOM-ing into the uncanny valley of XR telepresence.", Proceedings of the ACM on Human-Computer Interaction 5 (CSCW1), Apr. 22, 2021, pp. 1-31.

Steed, et al., "Beaming: an asymmetric telepresence system.", IEEE computer graphics and applications, vol. 32, No. 6, Nov. 1, 2012, pp. 10-17.

* cited by examiner

COLLABORATIVE SYSTEM

BACKGROUND

The working environment has changed so that it is now very common for some members of a team to be working remotely (e.g. at home) and others to be working in the workplace (e.g. in an office). Whilst some people may always work either remotely or in the workplace, many people have adopted hybrid working which involves a mixture of working remotely and working in the workplace. This means that for a team, the split of those members working remotely and those working in the workplace may not be the same every day. Various applications may be used to assist with collaborative working and facilitate interaction between those working remotely and those working in the workplace, for example through the use of desktop video conferencing and instant messaging.

The embodiments described below are not limited to implementations which solve any or all of the disadvantages of known systems and applications for collaborative working.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A computer-implemented method is described which comprises generating a representation of a digital space and generating a representation of a physical space using an audiovisual feed received from a camera proximate to a display located in the physical space. The representation of the digital space is generated using user information identifying a remote user associated with the display and presence information relating to the remote user and the digital representation comprises an avatar of the remote user. The representation of the digital space is output to the display located in the physical space and the representation of the physical space is output to a computing device associated with (e.g. operated by) the remote user. The method further comprises dynamically updating the representation of the digital space and/or the representation of the physical space in response to changes in the user information and presence information.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1A:
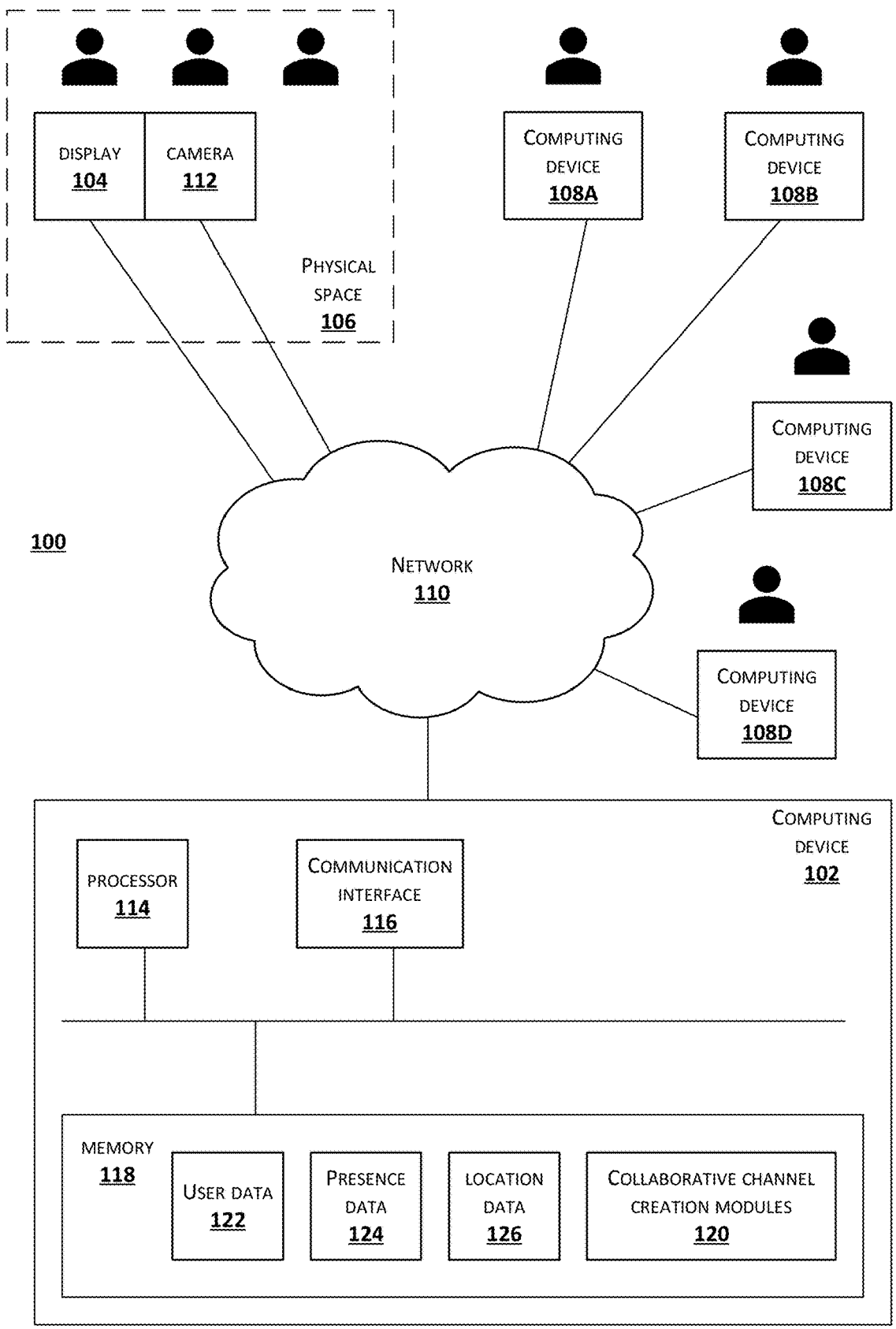
FIG. 1A is a schematic diagram showing an example collaborative system.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

As described above, hybrid working (i.e. working some days in the workplace and working remotely, such as at home, on other days) is now a common working arrangement. This means that for a team of people working together, on any given day, some team members will be working in the workplace and others will be working remotely, but exactly which team members are in the workplace and which are remote changes from day to day.

Described herein are systems and methods that enable communication between workers in the workplace, referred to herein as 'on-site workers' and remote workers, where this communication may be verbal or non-verbal, through an asymmetric user interface. The term 'asymmetric user interface' is used herein to refer to the fact that the user interface that is presented to remote workers and to on-site workers is different. The system generates a representation of a digital workspace (e.g. a visual representation) that includes avatars for the remote workers and outputs this to a display in the workplace. The system also generates a representation of the physical workplace (e.g. a visual representation and/or an audio representation) and outputs this to computing devices used by the remote workers. The systems and methods described herein react dynamically to changes in the remote workers, e.g. as workers log on and off from their remote computing devices, by dynamically updating the representation of the digital workspace (e.g. in real-time).

The systems and methods described herein may be used in scenarios other than the workplace. For example, at a conference where there are both remote and in-person attendees, in educational contexts where some students attend in person and others attend remotely, in social and entertainment contexts, etc. Consequently, to reflect the broader application of the systems and methods, in the following description the terms 'on-site user' and 'remote user' are used (instead of referring to workers). Additionally, the terms 'physical place' and 'digital space' are used instead of workplace and digital workspace respectively.

By providing the asymmetric user interface to both a display in the physical space (e.g. workplace), which can be viewed by on-site users (e.g. workers), and to the computing devices of remote users (e.g. workers) and by updating it dynamically, a new communication channel (and hence a new method of communication) between members of a group (e.g. team members) is established. Unlike existing communication channels, such as video conferencing, email and instant messaging where each individual communication session is relatively short (e.g. up to a few minutes in length for sending an instant messaging message or email and up to 2 hours for video conferencing), the communication channel provided by the system described herein is configured to be used for long sessions (e.g. running for the entire working day, week or longer). Furthermore, unlike existing communication applications, no user input is required by either remote or on-site users to trigger the generation and presentation of the representations, thereby reducing (or even eliminating) the burden of user input. This communication channel provides users, whether remote or on-site, with increased peripheral awareness of their fellow users (e.g. colleagues) over long periods of time in a manner which also provides privacy and information security. This increased social awareness (and reduction in social isolation) may increase productivity and effectiveness of users. By using the system described herein (and in particular because of the asymmetric configuration) it enables a remote user to access it via any computing device (e.g. including a mobile phone or VR headset).

Figure 2:
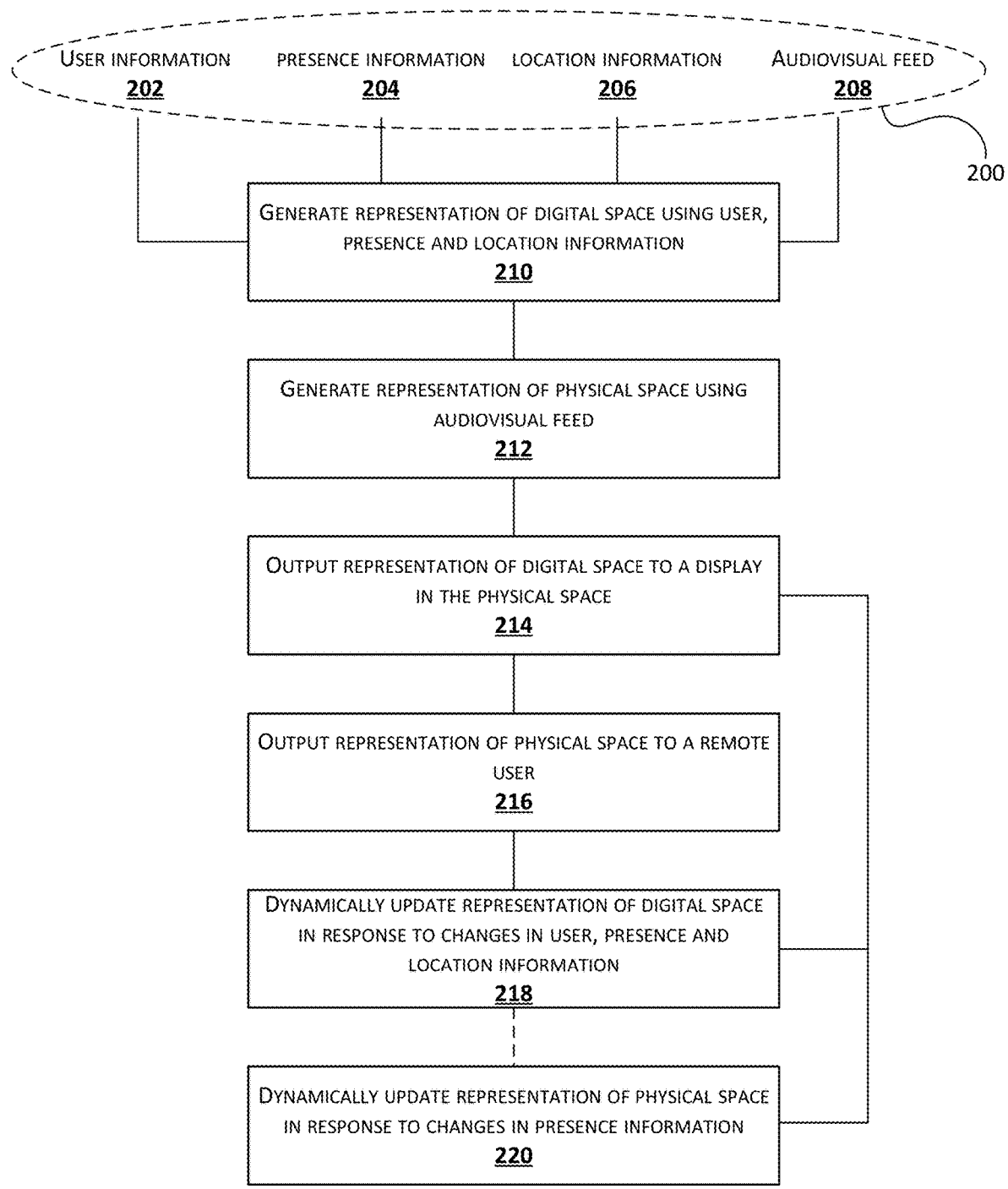
FIG. 2 is a flow diagram of an example method of operating a collaborative system such as shown in FIG. 1A.

FIG. 1A is a schematic diagram showing an example collaborative system (which may be referred to as a collaborative working system in the work context) and FIG. 2 is a flow diagram of an example method of operating a collaborative system such as shown in FIG. 1A. The system 100 comprises a computing device 102 that is configured to communicate with a display device 104 in a physical space 106. Whilst FIG. 1A only shows a single display device 104, the system 100 may comprise a plurality of display devices 104 in different locations within a physical space 106 and/or within different physical spaces (e.g. different workplaces). Whilst the computing device 102 is shown in FIG. 1A outside the physical space 106, in other examples it may be located within the physical space 106.

The computing device 102 is also configured to communicate with one or more computing devices 108A-D which are situated outside the physical space 106 (e.g. in the homes of remote users) and associated with (e.g. operated by) the remote users. These computing devices 108A-D may be any type of computing device (e.g. PC, laptop, head mounted display, mobile phone, etc.) and an example of such a computing device 108 is shown in more detail in FIG. 1C. In some examples all the remote computing devices 108A-D may be in different geographic locations and in other examples two or more of the computing devices 108A-D may be in the same location and the location of the remote computing devices 108A-D may not be fixed (e.g. where a remote user changes their remote location from their home to a shared working space or other location). It will be appreciated that there may be many more than four remote computing devices and the number of remote computing devices that are connected to the system will change over time as users change between on-site and being remote (e.g. as workers switch between working remotely and working on-site) and as the remote computing devices are switched on and off or disconnected from the system (e.g. by logging off from a VPN or switching to offline working etc.).

The computing devices 102, 108A-D and display 104 are shown interconnected by a network 110. Whilst the network 110 is depicted as a single entity in FIG. 1A, in most implementations, the network 110 is a combination of networks, such as a combination of public and private networks (e.g. a private network within the physical space, the internet and a home network).

As shown in FIG. 1A, there is a camera 112 that is co-located with the display 104. The camera 112 may be part of the housing of display 104 or it may be a separate device that is positioned above or below the display 104 or otherwise proximate to the display 104 such that the field of view of the camera 112 comprises a portion of the physical space 106 in front of the display, as shown in FIG. 3 (described below). In other examples, the camera 112 and display 104 may be integrally formed (e.g. comprising pixels with both output and sensing capabilities). Whilst the display 104 and camera 112 are shown connected directly to the network 110, there may be intermediary devices (e.g. an intermediary computing device to which the display 104 and camera 112 are connected) which are not shown in FIG. 1A. The camera 112 may be an RGB camera and/or a depth camera. The camera 112 may be a very wide-angle camera and/or one that is panoramic or remotely controlled.

The computing device 102 comprises one or more processors 114, a communication interface 116 that connects the computing device 102 to the network 110 and memory 118. The memory 118 is arranged to store a set of collaborative channel creation modules 120 that comprises computer executable instructions that, when executed by the one or more processors 114, cause the computing device 102 to implement the methods described herein (e.g. the method of FIG. 2). The set of collaborative channel creation modules 120 are shown in more detail in FIG. 1B and described below. The memory 118 is further arranged to store data used by and/or output by the collaborative channel creation modules 120, such as user data 122, presence data 124 and optionally location data 126. Whilst the user data 122, presence data 124 and location data 126 are shown stored in the memory 118, in other examples this data may be stored elsewhere (e.g. on another computing device not shown in FIG. 1A) and accessed by the collaborative channel creation modules 120 via the communication interface 116 and network 110. Furthermore, as described in more detail below, in some examples the user data 122 may incorporate the location data 126 such that separate location data is not required.

As shown in FIG. 2, the method of operating a collaborative system uses various input data 200 (user information 202, presence information 204, optional location information 206 and an audiovisual feed 208) to generate and then output representations of both a digital space and the physical space. The computing device 102 receives some or all of the input data 200 over the network 110 and/or accesses some or all of the input data 200 from a local store (e.g. memory 118) and performs the method blocks shown in FIG. 2 (e.g. when executing the instructions of the collaborative channel creation modules 120). The user information 202 and presence information 204? may, for example, be provided by a service such as Azure™ Active Directory™.

The user information 202 identifies a plurality of users associated with the physical space 106 where the display 104 is located (e.g. they are part of a team and at least some of that team are in the physical space 106). These users that are associated with the physical space 106 comprise users who are always remote users (and hence never on-site users) and users who are sometimes remote users and sometimes on-site users (in the physical space 106). Where there is more than one display in a physical space 106, the user information 202 may define different subsets of users (e.g. different non-overlapping subsets of users) that are associated with each display 104 in the physical space 106 and optionally define a physical space location for each identified user within the physical space 106 (e.g. in terms of coordinates of the user's desk or work station). For example, if the physical space 106 comprises multiple floors or areas with a display 104 located in each area, the user information 202 may define a different subset of users associated with each display 104 (e.g. a user may be assigned to a particular floor or area or their specified desk location may fall within a floor or area). In such examples, the user information 202 incorporates the location information 206 and separate location information which identifies the position of each display 104 is not required. Alternatively, the user information 202 may define a physical space location for each identified user within the physical space 106 without explicitly associating users with displays 104 and the location information 206, which defines the location of each display 104, may be used to filter the user information 202 (e.g. using a user's specified desk location) to identify a subset of users associated with each display.

Whilst FIG. 1A shows only a single physical space 106, in other examples there may be more than one physical space and in such examples the user information 202 may include data for users associated with each physical space.

The presence information 204 provides status information for each remote user. The presence information 204 may also provide status information for the on-site users. The status information may indicate that a user is in one of a pre-defined set of states that may include one or more of: offline, available, busy, be right back, do-not-disturb, and away. The pre-defined set of states may include many more states and a user may be able to define a custom state to be used for their presence information. The presence information 204 may be set automatically for a user (e.g. as detected using calendar information, keyboard/mouse activity, etc.) and/or may be set manually by the user (e.g. they may be able to set themselves to appear offline or away).

The user information 202, presence information 204, or other input data 200, may determine whether a user is remote or on-site. This determination may be made in a number of different ways. For example, a user may be determined to be on-site based on access data for the physical space (e.g. using data for access badges that are used to enter the physical space). In other examples, this may be determined based on calendar data or may be user-specified. In other examples it may be determined based on a user's IP address.

The camera 112 that is located in or near the display 104 (as described above) captures the live audiovisual feed 208 and transmits it (in real-time) to the computing device 102. The computing device 102 receives the audiovisual feed 208 from the camera 112 and where there are multiple displays 104 and hence multiple cameras 112, the computing device 102 receives audiovisual feeds 208 from each camera. An audiovisual feed 208 comprises video data and optionally audio data. In a variation on the system 100 shown in FIG. 1A, the camera 112 is replaced by a microphone and the audiovisual feed 208 comprises only audio data. In examples where the camera 112 is, or includes, a depth camera, the audiovisual feed 208 comprises depth information.

Figure 1B:
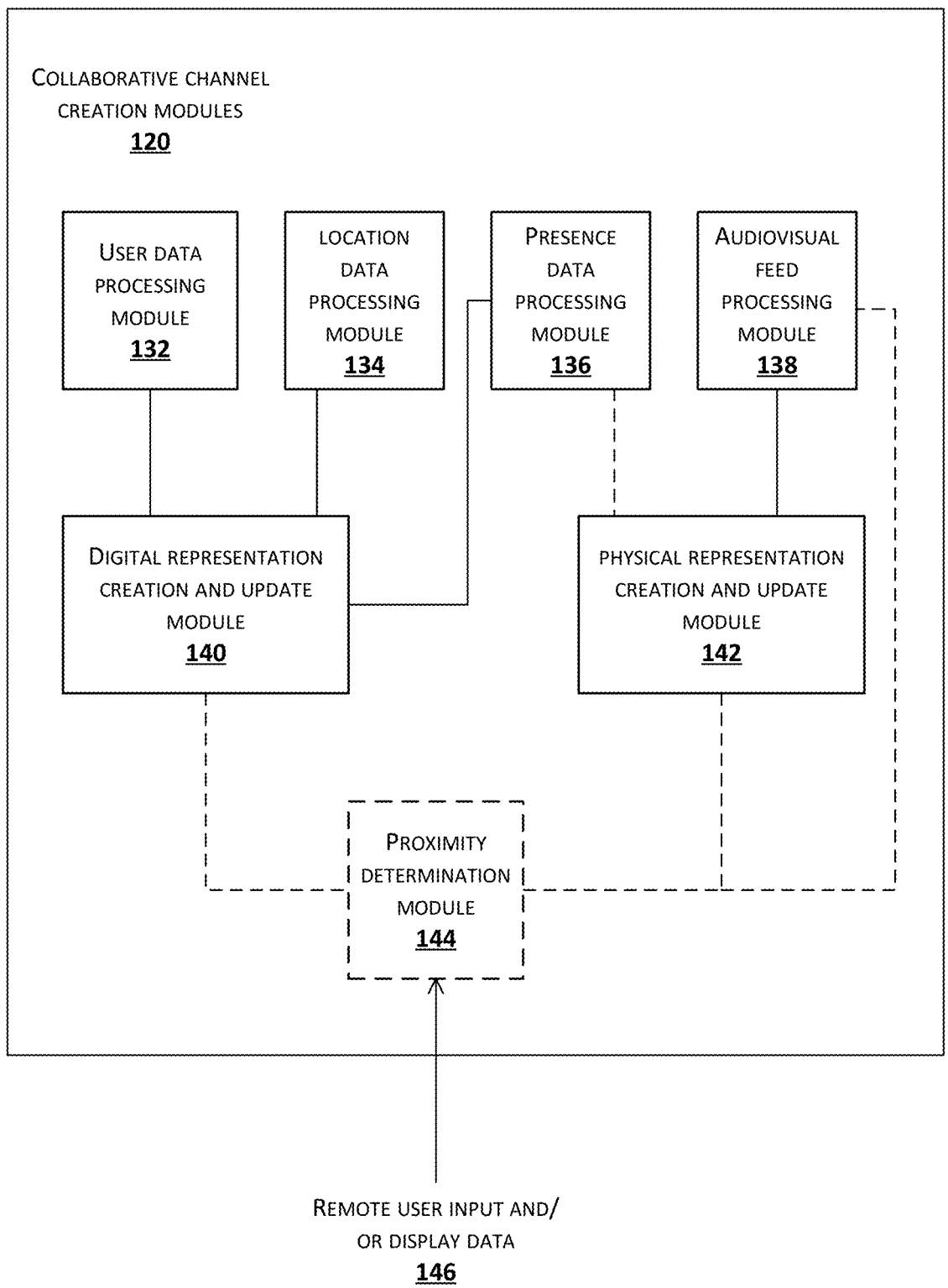
FIGS. 1B and 1C show elements of the system of FIG. 1A in more detail.

As shown in FIG. 2, the method comprises using the user, presence and optionally location information 202-206 to generate a representation of a digital space for output to a specific display 104 (block 210). As shown in FIG. 1B, the collaborative channel creation modules 120 comprises a user data processing module 132, location data processing module 134 and presence data processing module 136. The user data processing module 132 is configured to receive the user data 122, process it and provide input to a digital representation creation and update module 140. The location data processing module 134 is configured to receive the location data 126, process it and provide input to a digital representation creation and update module 140. The presence data processing module 136 is configured to receive the location data 124, process it and provide input to a digital representation creation and update module 140. The digital representation creation and update module 140 is configured to generate the representation of a digital space for output to a specific display 104 using the processed data that is received from the user data processing module 132, location data processing module 134 and presence data processing module 136.

Figure 3A:
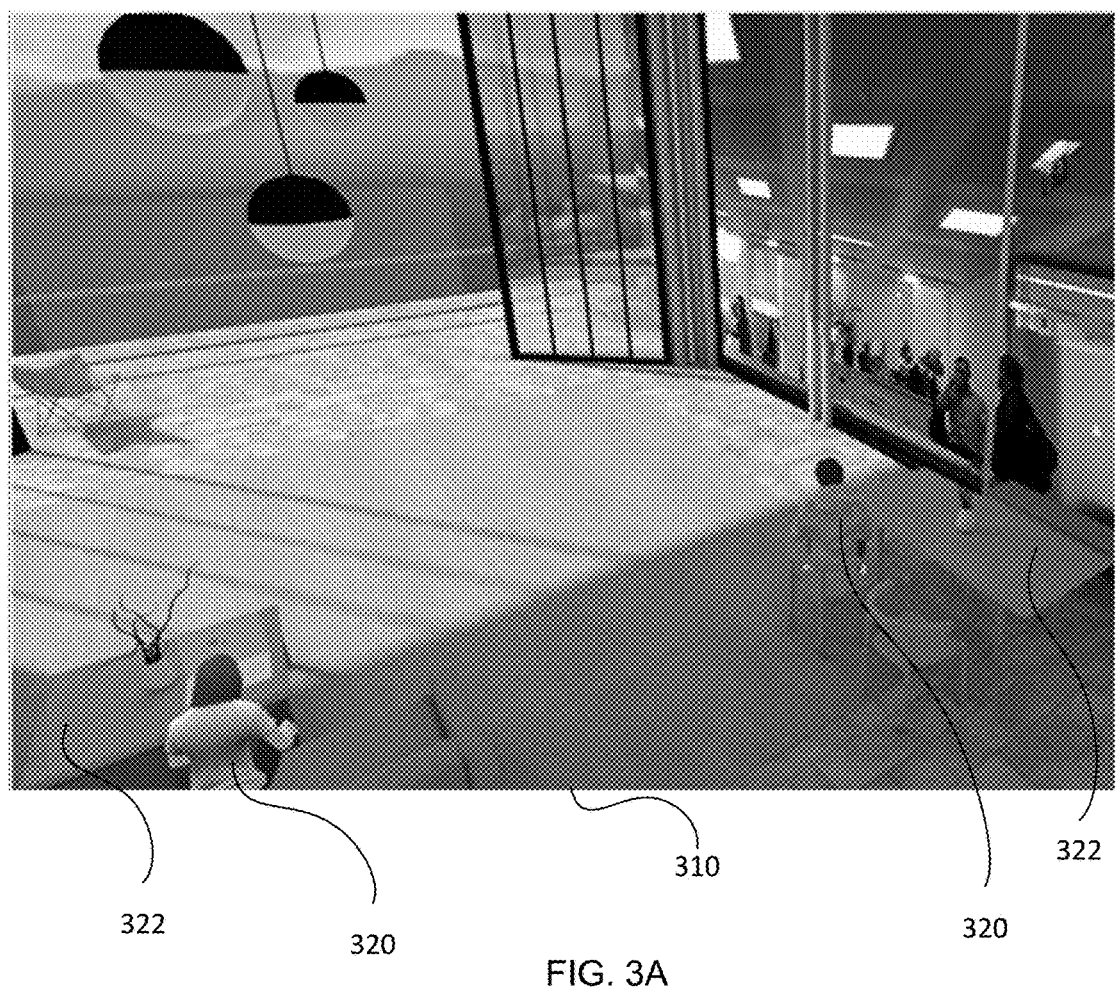
FIGS. 3A, 3B, 3D, and 3E show various examples of a representation of a digital space.

The representation 310 of the digital space that is generated for output to a particular display (in block 210) by the digital representation creation and update module 140, comprises avatars 320 for some or all of the remote users associated with that display (as determined using the user information 202 and optionally the location information 206) dependent upon their status (as determined using the presence information 204), as shown in FIG. 3A. The representation 310 of the digital space may comprise avatars 320 only for those remote users that are currently online (i.e. they are connected to the system 100 and hence do not have a status of offline) and the avatars may be depicted in a working environment (e.g. sitting at desks or tables 322) or other environment dependent upon the nature of the group of users (e.g. whether they are workers, attendees at a conference, members of a social club, etc.). The avatars may change dependent upon the status of the remote user, e.g. they may be shown in different colors or in different poses dependent upon their status (e.g. based on the output from the presence data processing module 136). The avatar data for a user may be included in the user information 202 or may be provided as a separate input to the method. There are many possible sources for the avatar data including, but not limited to: Microsoft™ Mesh, Microsoft Teams™, Xbox™, from other input techniques such as using VR controllers, computer vision techniques, etc. The avatar data may include avatar pose which may, for example, be estimated via the audio channel (e.g. by translating syllables into facial expressions that correspond to someone saying the detected word and where these facial expressions may be referred to as 'visemes'). Avatar body pose may be estimated using, for example, webcam tracking of the face or skeleton, IMU signals that measure motions (e.g. in 6DOF) and accelerometers, etc. In some implementations, a number of different (and perhaps sparse) signals may be used in combination to detect the pose of a remote user and then animate an avatar within the representation that is created in a naturalistic manner. Microsoft™ Mesh or any 3D engine (e.g. Unity) or immersive world system may be used to generate the representation of the digital space.

Figure 3B:
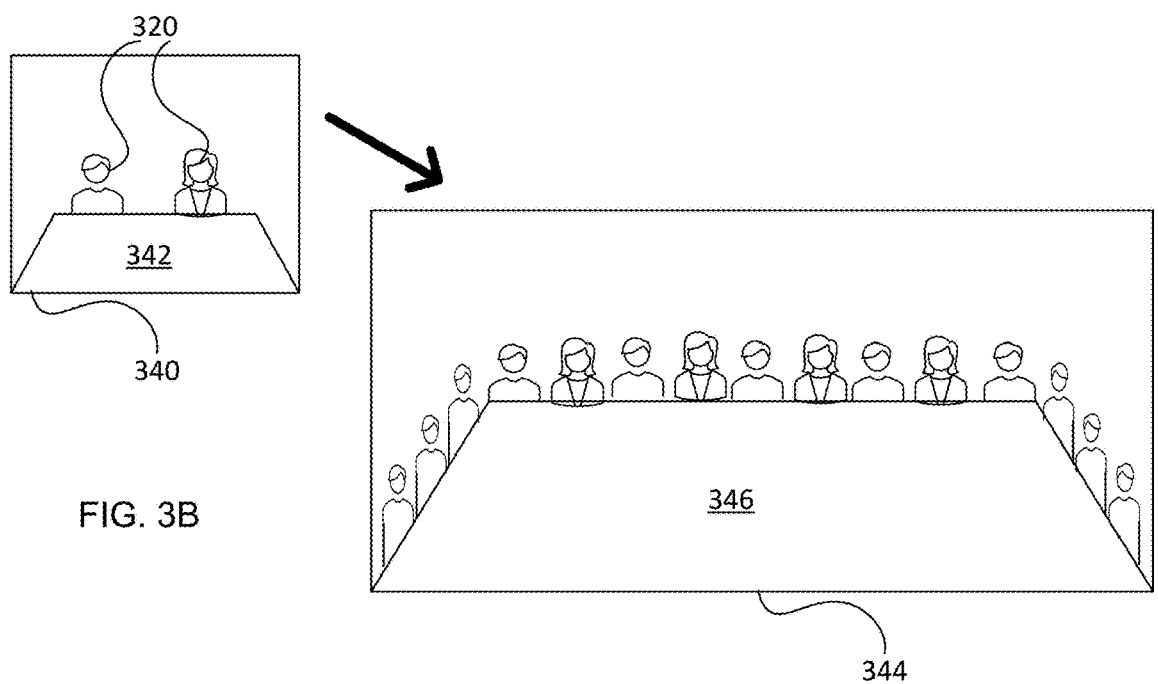

The size of the digital space (in the representation generated in block 210) may be scaled according to the number of avatars 322 that are included (e.g. to present a "right-sized" space for the number of remote users shown). For example, as shown in FIG. 3B, if there are only two remote users associated with a particular display 104 that are currently online, then the representation 340 that is generated for display on that display 104 may show a small office or room containing only two desks or a small table 342 at which the two avatars 320 corresponding to the two remote users are shown seated, or for non-work applications, there may be sofas or chairs in which the avatars are shown seated. If, however, there are fifteen remote users associated with the particular display 104 that are currently online, then the representation 344 that is generated may show a larger office or room containing fifteen positions, one for each avatar (e.g. fifteen desks and/or chairs, one for each avatar or one or more larger tables 344 with a total of 15 spaces).

Figure 3C:
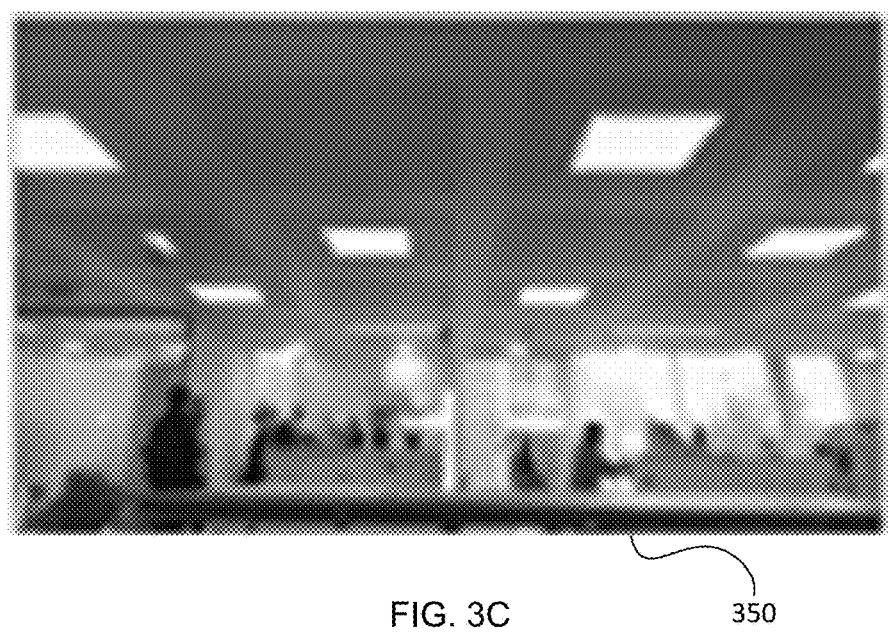
FIGS. 3C, 3G, 3H and 3I show various examples of a representation of a physical space.

In addition to generating a representation of the digital space for output to a specific display 104 (in block 210), the method also comprises generating a representation of the physical space which corresponds to the same display 104 (block 212). This representation of the physical space is generated using the live audiovisual feed 208 received from the camera 112 that is proximate to the display 104 and may comprise a video stream corresponding to the video data in the audiovisual feed 208. As shown in FIG. 1B, the collaborative channel creation modules 120 comprises an audiovisual feed processing module 138 that performs the processing of the audiovisual feed 208 and provide input to a physical representation creation and update module 142. The physical representation creation and update module 142 is configured to generate the representation of a physical space for output to the remote computing devices 108A-D space using the processed audiovisual feed data that is received from the audiovisual feed processing module 138. The representation may include a video stream without any audio (i.e. a silent video stream) to provide security (e.g. so that anyone in the same room as the remote user cannot hear what is being said in the physical space 106) and an example frame 350 from the representation is shown in FIG. 3C. In such an example, generating the representation comprises processing the live audiovisual feed 208 to remove the audio and this processing may be performed by the audiovisual feed processing module 138 and/or the physical representation creation and update module 142. Alternatively, the representation may include a video stream with audio that has been processed (e.g. to remove high frequencies) such that security is preserved (in a similar manner to the silent version) but providing additional sensory data to the remote user so that they can tell if the physical space is very quiet or noisy. In such an example, generating the representation comprises processing the audio from the live audiovisual feed 208.

Figure 3D:
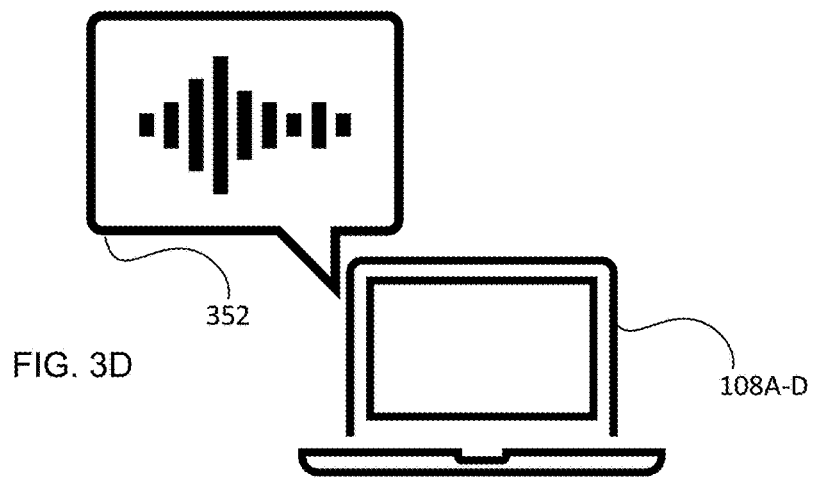

In a further example, as shown in FIG. 3D, the processed audio may be provided without any video data, so as to provide the remote user with a soundscape representation 352 of the physical space 106. In addition, or instead, the activity of remote users may be translated into a soundscape for on-site users and played from speakers located proximate to the display 104. For example, a different pitch of note may be assigned to each remote user, thereby forming a chord for a plurality of remote users and the note may change (e.g. in terms of volume or other characteristic) in response to changes in presence status for remote users.

The video stream (and/or depth data where provided in the audiovisual feed 208) may be analyzed (e.g. using image recognition, computer vision, proximity sensors, photosensors and/or machine learning which may be implemented within the audiovisual feed processing module 138) to identify particular actions or gestures by people captured in the video stream (e.g. a person waving, a person walking past, etc.) and for each such identified action or gesture an audio effect may be added to the audio stream (e.g. the sound of footsteps may be added in response to detecting a person walking past the display). This provides a remote user with more information about what is happening in the physical space 106 but in a manner that can be consumed with less distraction than viewing a video stream. The soundscape representation 352 may also require less bandwidth to be transmitted to the remote user and so may be suited to bandwidth constrained scenarios (e.g. where the connection to the remote user is of low bandwidth or where the remote user is performing bandwidth intensive operations and so there is little available bandwidth for the additional communication channel described herein).

Having generated the representations (in block 210-212), the representation of the digital space is output (via the communication interface 116) to the display 104 in the physical space for which it was generated (block 214) and the representation of the physical space is output (via the communication interface 116) to the computing device of a remote user 108A-D that is associated with the particular display 104 (block 216), i.e. that is associated with the display 104 that is proximate to the camera 112 that generated the live audiovisual feed 208 used to generate the representation. For example, if two representations of digital spaces are created, a first representation comprising avatars for remote users associated with a first display and a second representation comprising avatars for remote users associated with a second display, then the first representation is output to the first display and the second representation is output to the second display. Consequently only remote users associated with a particular display receive the corresponding representation of the physical space proximate to that display and only those who are in the physical space 106 and viewing the display 104 can see the digital representation created for that display 104. This provides both security and privacy for users, whether remote or on-site.

Figure 3E:
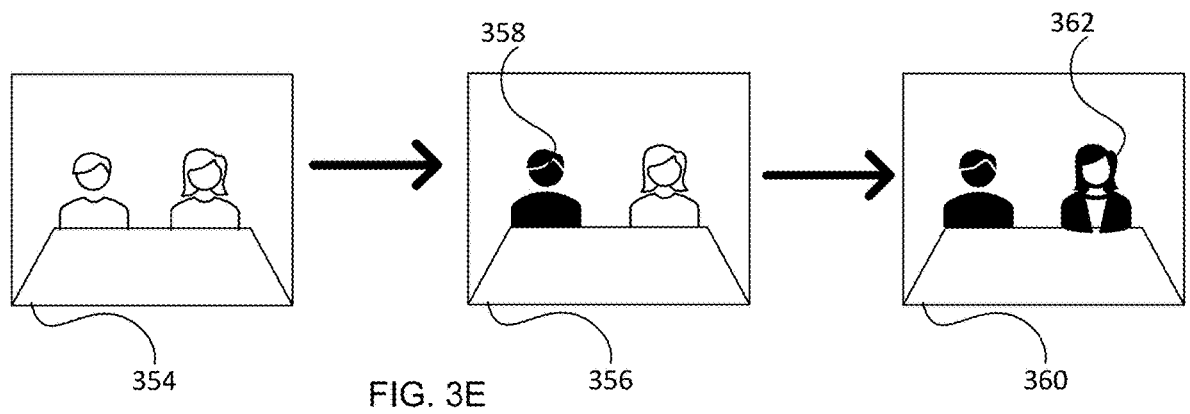

The representation of the physical space that is generated (in block 212) is inherently not static because it is generated from a live audiovisual feed 208 that is received from a camera 112 proximate to the particular display 104 to which the representation corresponds. The representation of the digital space is not generated using a live audiovisual feed to provide privacy to the remote users; however, it also is not static. As shown in FIG. 2, the method further comprises dynamically updating the representation of the digital space in response to changes in the user, presence and optionally location information 202-206 (block 218). For example, in response to the number of avatars to be represented in the digital representation changing (e.g. as users connect or disconnect from the system), the size of the digital space that is depicted changes (e.g. as shown in FIG. 3B) and one or more avatars are added or removed (e.g. the size of the digital space is increased in response to the number of remote users increasing and the size of the digital space is decreased in response to the number of remote users decreasing). Furthermore, where the avatars reflect the status of a remote user, the avatars are dynamically updated in response to changes in status (e.g. where a remote user changes status from available to busy), as shown in FIG. 3E. FIG. 3E shows a first representation 354 in which both remote users are have a same, first status (e.g. available) and so their avatars are shown in the same manner (e.g. outline only). In the second representation 356, one of the remote users has changed status to a second status (e.g. to busy) and so their avatar changes 358 and in the third representation 360, the other remote user has also changed status to the second status, as reflected in their avatar 362.

The method of FIG. 2 generates a single representation of the digital space (in block 214); however, it may generate one or more different representations of the physical space (in block 212). A different representation of the physical space may be generated for each of the computing devices 108A-D dependent upon a proximity parameter of the particular computing device. Alternatively, a plurality of different representations may be generated, each corresponding to a different proximity parameter, and then, for a computing device 108A-D, one of the plurality of different representations is selected and output dependent upon the proximity parameter of the particular computing device.

Figure 3F:
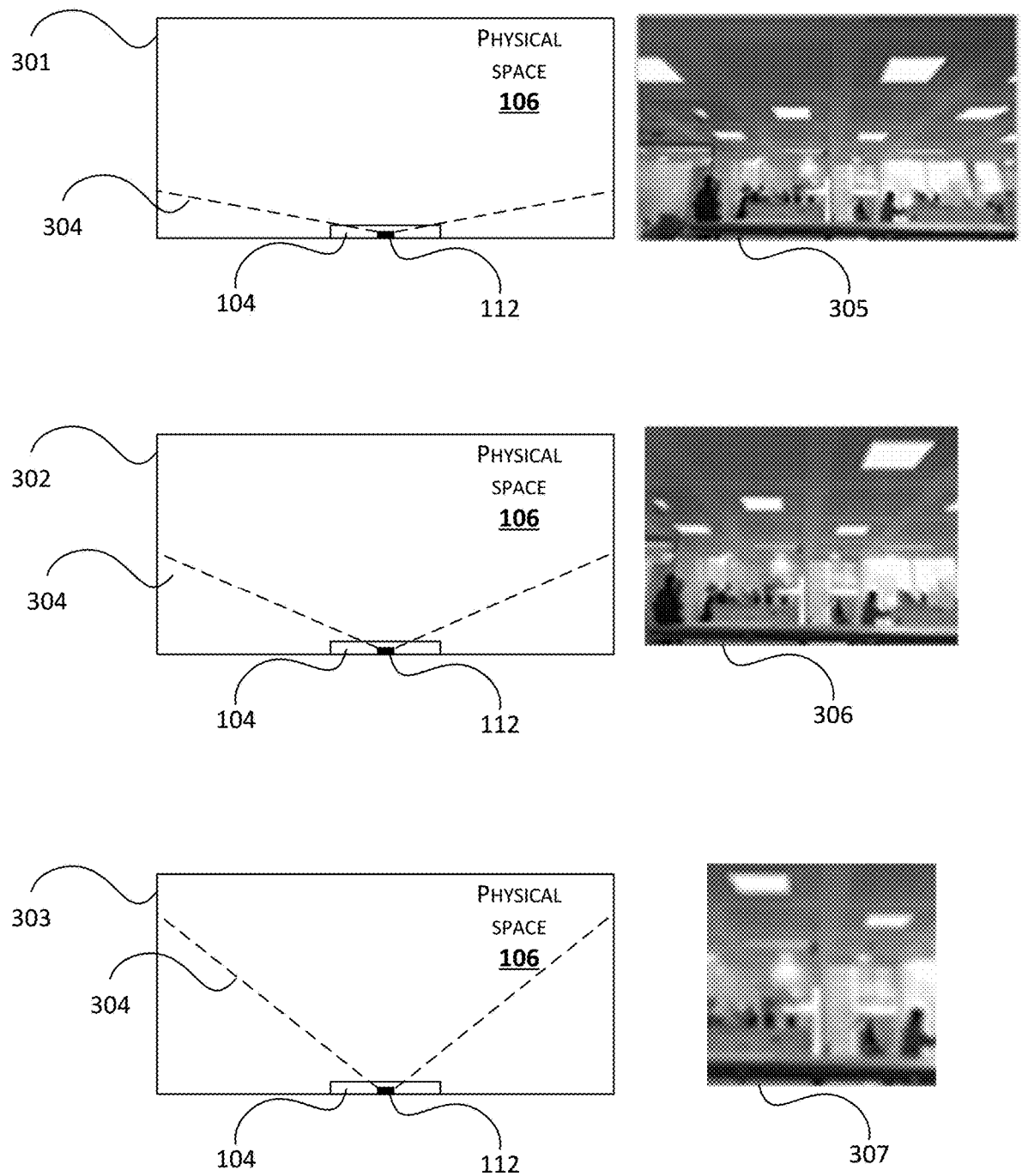
FIG. 3F shows three examples of a plan view of a physical space with different fields of view along with corresponding representations of the physical space.
Figure 3G:

The proximity parameter for a computing device is determined according to the corresponding remote user's interaction (or engagement) with the representation of the physical space, as determined by analyzing the manner in which the representation is displayed on the computing device. The proximity parameter may be determined by the proximity determination module 144 which is part of the set of collaborative channel creation modules 120 and this module 114 may receive remote user input and/or display data 146 from the remote computing devices 108A-D (e.g. via the communication interface 116). The determination of proximity parameter may be determined by analysis of the remote user input and/or display data 146. There may be a default, low, proximity parameter that is allocated to a computing device (e.g. by the module 144) when it is initially connected to the system. The proximity parameter for a computing device may be increased (e.g. by the module 144) if the representation is shown full screen on the computing device or if the remote worker clicks on the representation. The proximity parameter for a computing device may be reduced if the representation is displayed in a smaller area of the display (e.g. where the amount of reduction increases as the display area gets smaller). The proximity parameter may be increased if the window in which the representation is displayed is not obscured by other windows in the user interface of the computing device and may be reduced if it is partially or fully obscured (e.g. where the amount of reduction increases as more of the window is obscured). In addition, or instead, a remote user may be able to interact with the digital representation in other ways (e.g. using their mouse or arrow keys) to cause a change in the proximity parameter of their computing device. In examples where the representation of the physical space is displayed within a user interface (UI) that includes an avatar of the remote user, the proximity parameter may be determined (using display data) dependent upon the proximity of the avatar to a window in the UI that contains the representation of the physical space. This is described below in relation to FIG. 4D where the UI includes more than one window but the methods may also be used where the UI includes only a single window and hence a single representation of a physical space.

Where proximity parameters are defined, the representation of the physical space that is output to a particular computing device changes in response to changes in the proximity parameter of that computing device. The representation may be modified to change the field of view of the physical space that is shown dependent upon the proximity parameter, as shown in FIG. 3F. FIG. 3F shows three examples 301-303 of a plan view of the physical space 106 with different fields of view marked with dotted lines 304 and three corresponding representations of the physical space 305-307. The physical space 106 comprises a display 104 and a camera 112 that captures the audiovisual feed 208. Whilst the actual field of view of the camera 112, and hence the captured audiovisual feed 208, does not change, when generating the different representations for different proximity parameters, the audiovisual feed 208 is processed (e.g. by the audiovisual feed processing input module 138 using input from the proximity determination module 144 or by the physical representation creation and update module 142 using input from the proximity determination module 144) so that the field of view of the video stream in the representation 305-307 changes according to the proximity parameter. The first example 301 in FIG. 3 represents the field of view for a maximum proximity parameter value and this corresponds to the actual field of view of the camera 112. The third example 303 shows the smallest field of view and this corresponds to a minimum proximity parameter value. The second example 302 shows an intermediate field of view and this corresponds to a proximity parameter value that is between the minimum and maximum values.

Referring back to the system shown in FIG. 1A, if a first computing device 108A has a maximum proximity parameter value it receives a representation 305 of the physical space (output in block 216) that corresponds to the first example 301 in FIG. 3. If a second computing device 108B has a proximity parameter that is between the maximum and minimum values it receives a representation 306 that corresponds to the second example 302. If a third computing device 108C has a minimum proximity parameter value it receives a representation 307 that corresponds to the third example 303. If a fourth computing device 108D has just connected to the system 100 and hence has a default value of proximity parameter it may receive a representation 307 that corresponds to the third example 303 (e.g. where, by default, the proximity parameter is set to the minimum value).

The varying of the representation according to proximity parameter as described above may be used to increase the security and privacy of the physical space 106 since by default (i.e. without specific interaction by the remote user) the representation that is output to the computing device shows the narrowest field of view (e.g. as in representation 307 shown in FIG. 3F) and hence provides the smallest visibility into the physical space 106.

In the examples described above, the representation of the physical space (generated in block 212 and output in block 216) includes the video stream from the audiovisual feed 208 either with no audio or with processed audio, or does not include any video stream but only audio. In a further example, when generating the representation of the physical space from the audiovisual feed 208 (in block 212), the video stream is processed (e.g. by the audiovisual feed processing module 138) to dynamically replace any people that are visible in the video stream by avatars 372 (e.g. using Microsoft Designer and DALL.E or another AI system that generates or edits visual representations) and hence create a modified video stream. The resulting representation 372 that is output (in block 216) comprises the modified video stream with no audio or with processed audio (as described above), as shown in FIG. 3G. The generation of the modified video stream may comprise identifying the person visible in the video stream using image processing techniques and then replacing the person with their avatar (where the avatar data may be included within the user information 202). Where a person cannot be identified, a generic avatar is used to replace them in the modified video stream. Alternatively, the identification may be omitted and a generic avatar (or one of a plurality of different generic avatars) may be used to replace all people visible in the video stream. Use of avatars 372 in the representation 370 of the physical space increases the security of the system.

Figure 3H:
Figure 3I:
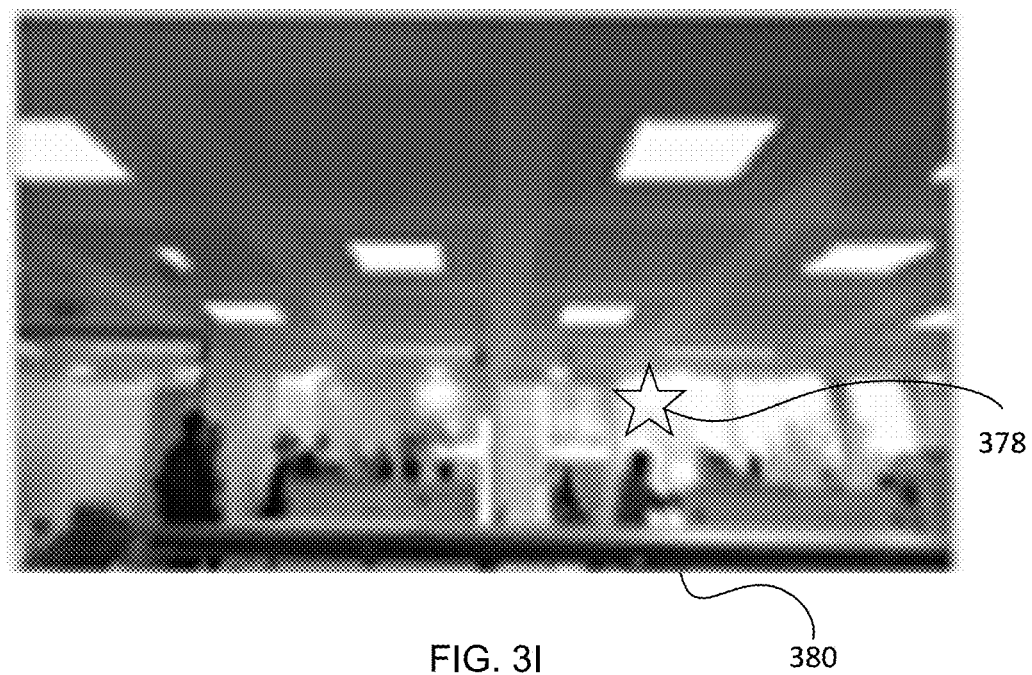

Instead of using avatars in the representation of the physical space to increase the security and privacy of the system, an on-site user's desk or work station that is visible in the audiovisual feed 208 may be selectively obscured based on the presence information 204 for that on-site user or based on user-configured parameters. For example, in response to an on-site user having a particular status in the presence information 204 (e.g. 'do not disturb' or 'appear away') the on-site user's desk or work station 374 may be obscured when generating the representation 376 of the physical space from the audiovisual feed 208 (in block 212), as shown in FIG. 3H. The obscuring may be implemented by pixelating the part of the video stream that shows the on-site user's desk or work station or by use of an overlay object that covers the on-site user's desk or work station within the video stream in the representation. The system may provide user configurable controls to enable users to specify when and how the obscuring is applied (e.g. they may specify the nature of the object used to obscure their desk or work station and/or specify the status or times of day that trigger the obscuring). The obscuring may also be used in combination with the use of avatars 372 in the representation of the physical space to further increase security and privacy.

Figure 1C:
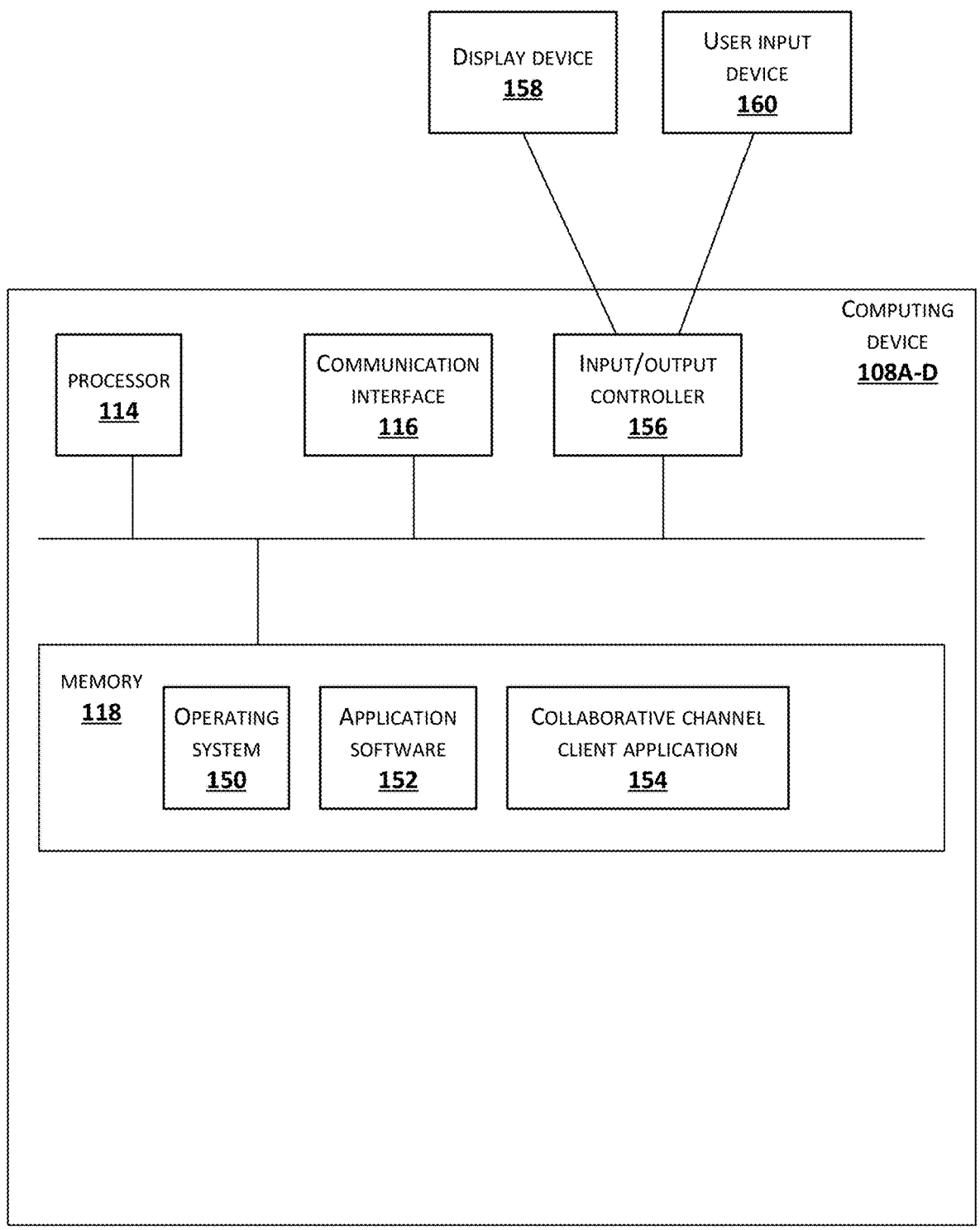

A remote user may be associated with a single display 104 or may be associated with more than one display 104, e.g. with two or more displays 104 in different positions (e.g. different locations and/or orientations) within the physical space 106. Where a remote user is associated with more than one display 104, their computing device receives a representation of the physical space that corresponds to each display with which they are associated. These representations may be combined into a single user interface (UI) by the computing device 102 (e.g. by the physical representation creation and update module 142) or by the remote user's computing device (e.g. by a collaborative channel client application 154, as shown in FIG. 1C).

Figure 4A:
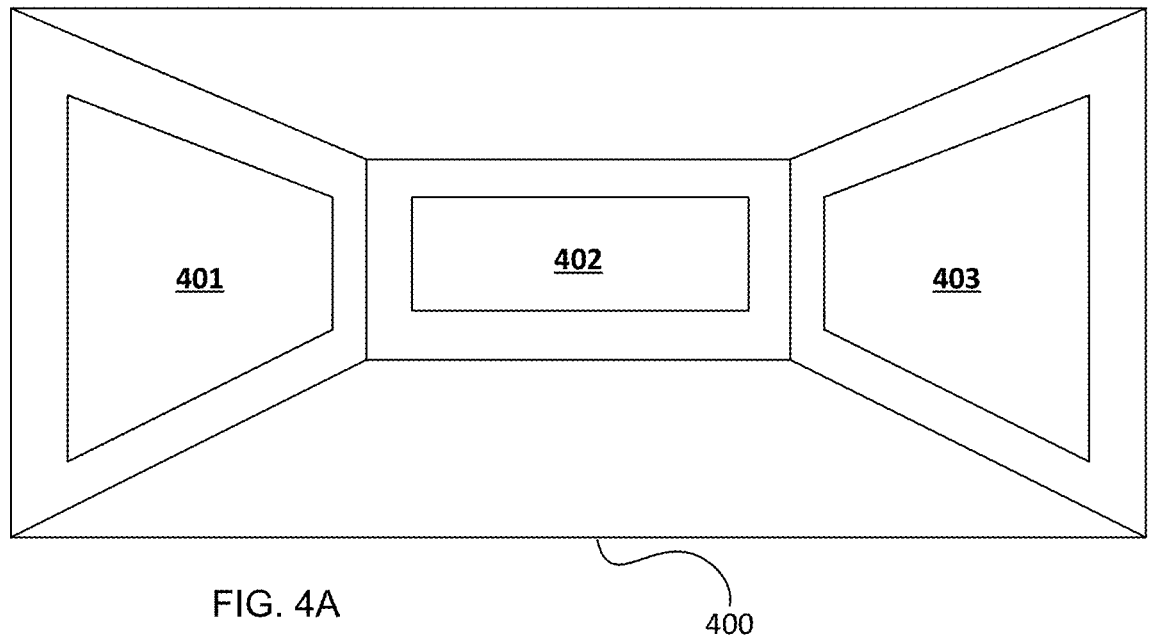
FIGS. 4A, 4C, 4E, 4G, and 4H show example user interfaces.
Figure 4B:
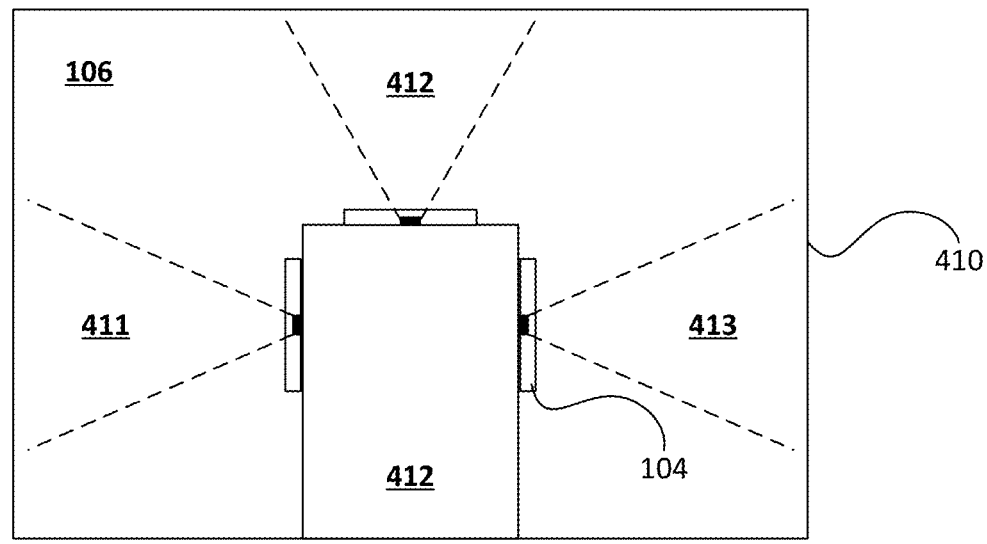
FIG. 4B shows a further example plan view of a physical space which corresponds to the user interface shown in FIG. 4A.

A first example of such a UI 400 is shown in FIG. 4A. In the example UI 400, there are three windows 401-403 that each contain a different representation of the physical space 106, i.e. they each contain a representation associated with a different display 104. The different representations may be positioned and oriented within the UI 400 to reflect the relative positions of the different displays 104 and an example plan view 410 of the physical space 106 showing the three different displays 104 is shown in FIG. 4B. The left window 401 in the UI displays the representation corresponding to the display on the left (with field of view 411), the center window 402 displays the representation corresponding to the display in the center (with field of view 412) and the right window 403 displays the representation corresponding to the display on the right (with field of view 413).

Figure 4C:
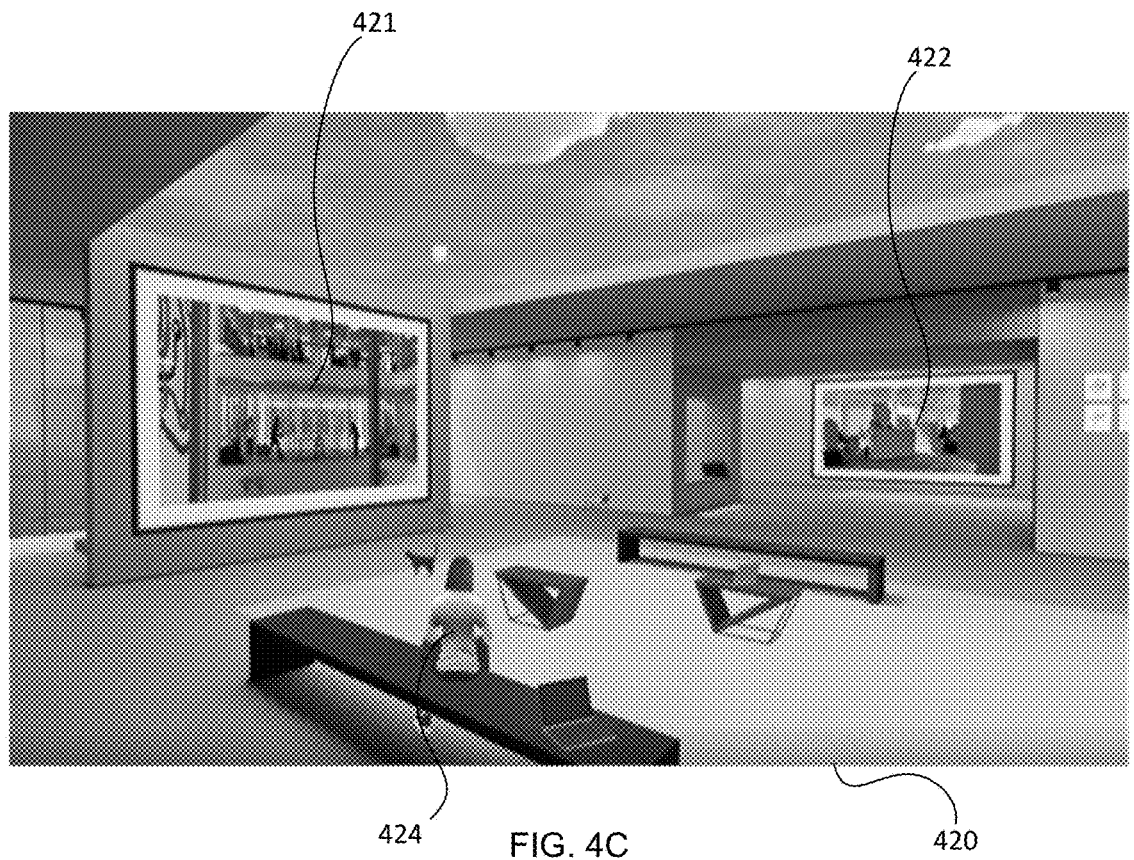
Figure 4D:
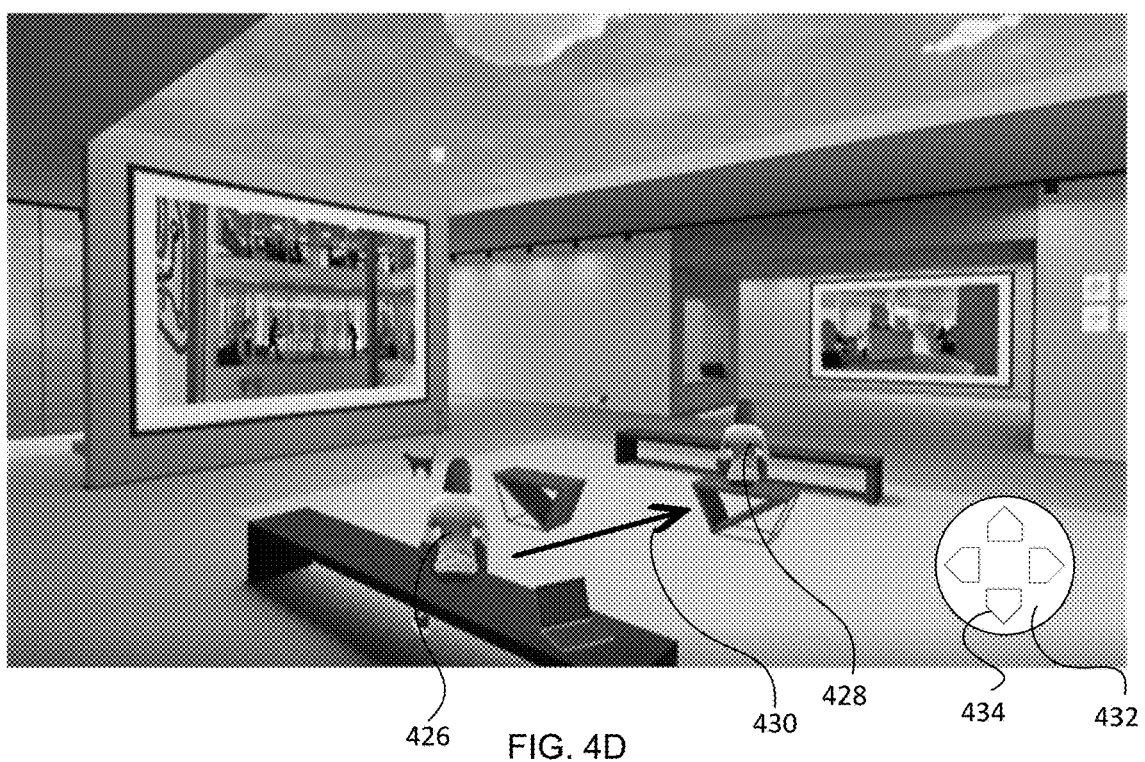
FIGS. 4D and 4F show further examples of a representation of a digital space.

A second example of such a UI 420 is shown in FIG. 4C. In the example UI 420, there are two windows 421, 422 that each contain a different representation of the physical space 106, i.e. they each contain a representation associated with a different display 104. As described above, the different representations may be positioned and oriented within the UI 420 to reflect the relative positions of the different displays 104. The example UI 420 shown in FIG. 4C also includes an avatar 424 and this may be avatar of the remote user associated with the representations that are displayed in the windows 421, 422 or the avatar of another remote user that is associated with the physical spaces depicted in one of the windows 421, 422.

Where the UI 400, 420 includes more than one window, the computing device 108A-D that displays the UI may have a proximity parameter associated with each window (and hence each corresponding display) that is used to adjust the field of view that is visible within the respective window.

Where the UI 420 includes the avatar 424 of the remote user associated with the representations that are displayed in the windows 421, 422, as in the example shown in FIG. 4C, the remote user may be able to cause the position of the avatar 424 to change within the UI, e.g. from a first position 426 to a second position 428, as shown in FIG. 4D (with the motion indicated by arrow 430). In the example shown in FIG. 4D, a keypad 432 is provided within the UI and the position of the avatar changes in response to receipt of user clicks on the keypad 432 (e.g. user clicks on each of the directional buttons 434 within the keypad 432). These user inputs may be received by the remote computing device 108A-D that the remote user is using (e.g. input via a user input device 160 and received via an input/output controller 156, as shown in FIG. 1C) and transmitted (e.g. via the communication interface 116) to the computing device 102 that generates the UI. In response to receiving the user input 146, the computing device 102 (e.g. the proximity determination module 144) updates the proximity parameters for the remote computing device using the new position of the avatar and updates the UI to show the avatar in the new position. The motion of the avatar from the first position 426 to the second position 428 may be animated (e.g. such that the avatar appears to walk from the first position to the second position) or the avatar may move instantaneously between positions (e.g. such that the avatar disappears from the first position and reappears at the second position). In other examples, user inputs, animations and/or motions may be used. For example, instead of using the keypad 432, a user may move their avatar using a drag and drop motion or by clicking at the position the avatar is to be moved to (e.g. by clicking at the second position in the example described above).

Figure 4E:
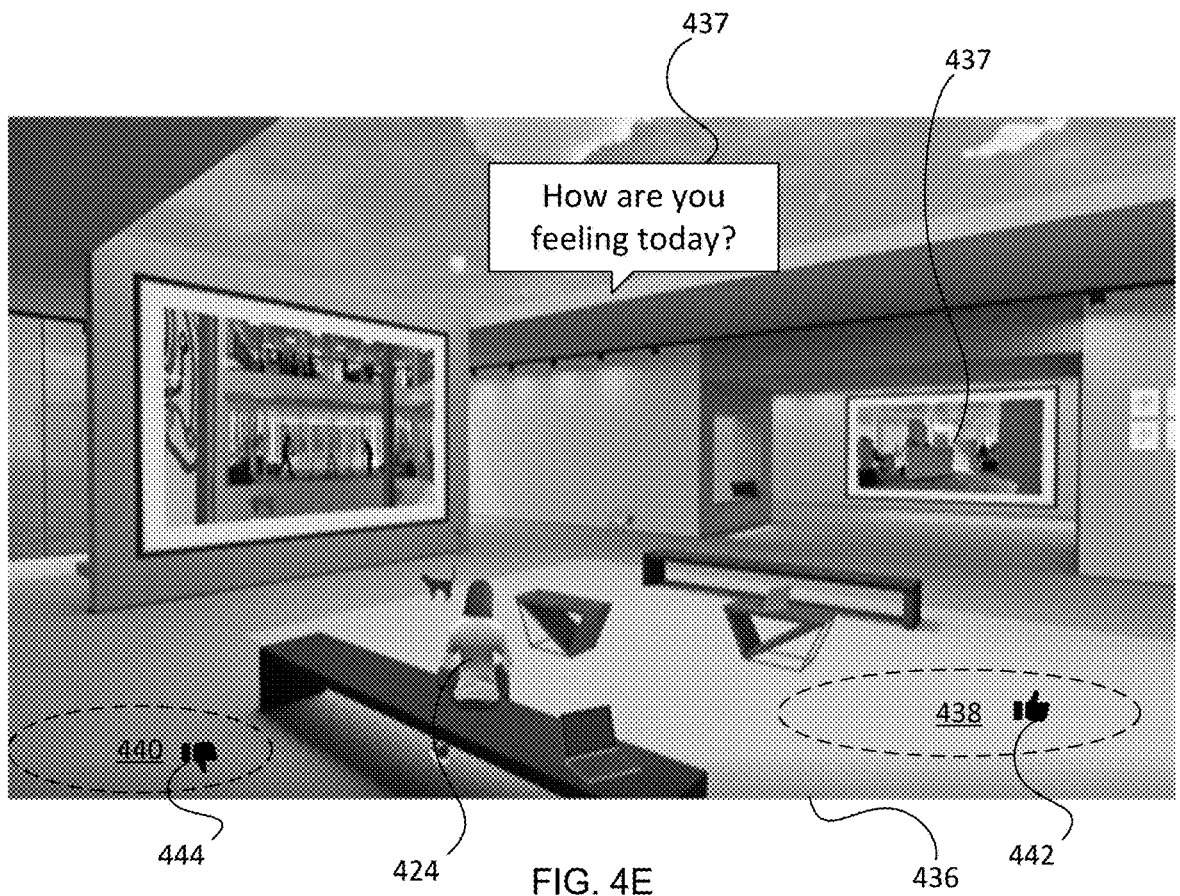

As described above, the movement of an avatar of a remote user by the remote user may trigger an update to the proximity parameter for the corresponding remote computing device (e.g. for the computing device associated with the remote user represented by the avatar). In addition, or instead, the movement of an avatar of a remote user by the remote user may trigger other actions. In an example, the movement of an avatar by a remote user may provide a user input dependent upon the position to which the avatar is moved within the UI and this can be described with reference to FIG. 4E. As shown in FIG. 4E a UI 436 is displayed to a remote user on the display device 158 of a remote computing device 108A-D. This UI 436, which may be generated by either the collaborative channel client application 154 running on the remote computing device 108A-D or the physical representation creation and update module 142 on the central computing device 102, comprises an avatar 424 of the remote user and a window 437 in which the representation of a physical space is shown. The UI also comprises UI elements indicating one or more different regions 438, 440 within the UI 436, each region corresponding to a different user input. In the example shown in FIG. 4E, the UI also comprises an icon or other graphical element 442, 444 positioned in or near each region 438, 440 that indicates the user input associated with the particular region. In the example shown in FIG. 4E, if the remote user moves their avatar 424 so that it is positioned within the first region 438, the user input of a thumbs up is determined whereas if the remote user moves their avatar 424 so that it is positioned within the second region 440, the user input of a thumbs down is determined. The UI may also include a UI element, e.g. in the form of a text box 446, which poses a question or statement to which the user inputs provide a response. Such a means of user input may, for example, be used to collectively poll remote workers (e.g. to gauge mood or mental health within a team).

The method described above with reference to FIG. 4E enables user input by remote workers through interaction with their avatar in a UI that includes the representation of the physical space. Similar functionality may also be provided for on-site workers; however as they do not have their own dedicated UI, input by an on-site worker is through interaction with the representation 445 of the digital space that is presented on the display 104 that is located in the physical space 106. In various examples, the representation of the digital space 310 that is displayed on the display 104 in the physical space may comprise an overlay of the same question 437 and response regions 438, 440 and any corresponding visual elements that are included within the UI presented to remote workers via the remote computing devices 108A-D. The overlay may also comprise an icon 446 or avatar corresponding to each on-site worker and in the example shown in FIG. 4F, these icons 446 are provided in a panel 448 alongside (e.g. above) the representation 445 of the digital space. To provide a response to the question, an on-site worker drags their icon/avatar into the corresponding region and this user interaction is detected by the computing device 102. In various examples the display 104 may be a touch-screen display or alternatively a user input device may be provided associated with the display 104 (e.g. in the form of a mouse, games controller, etc.).

Figure 4F:
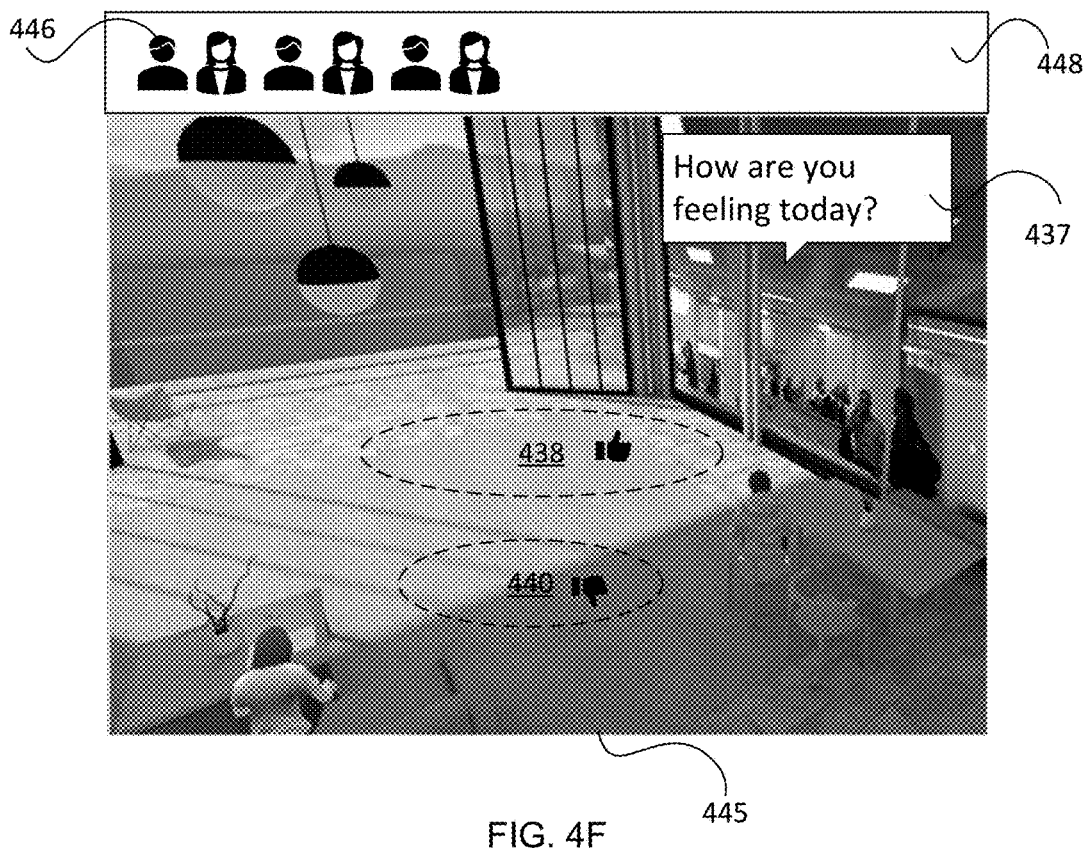

Whilst the examples shown in FIGS. 4E and 4F show two regions and hence two possible user inputs, it will be appreciated that there may be more than two regions and more than two possible user inputs. For example, the regions presented within the UI on the remote computing devices 108A-D and overlaid on the representation of the digital space on the display 104 in the physical space 106 may take the form of a map of countries and a user, whether on-site or remote, may provide an input indicating the country where they currently live.

Figure 4G:
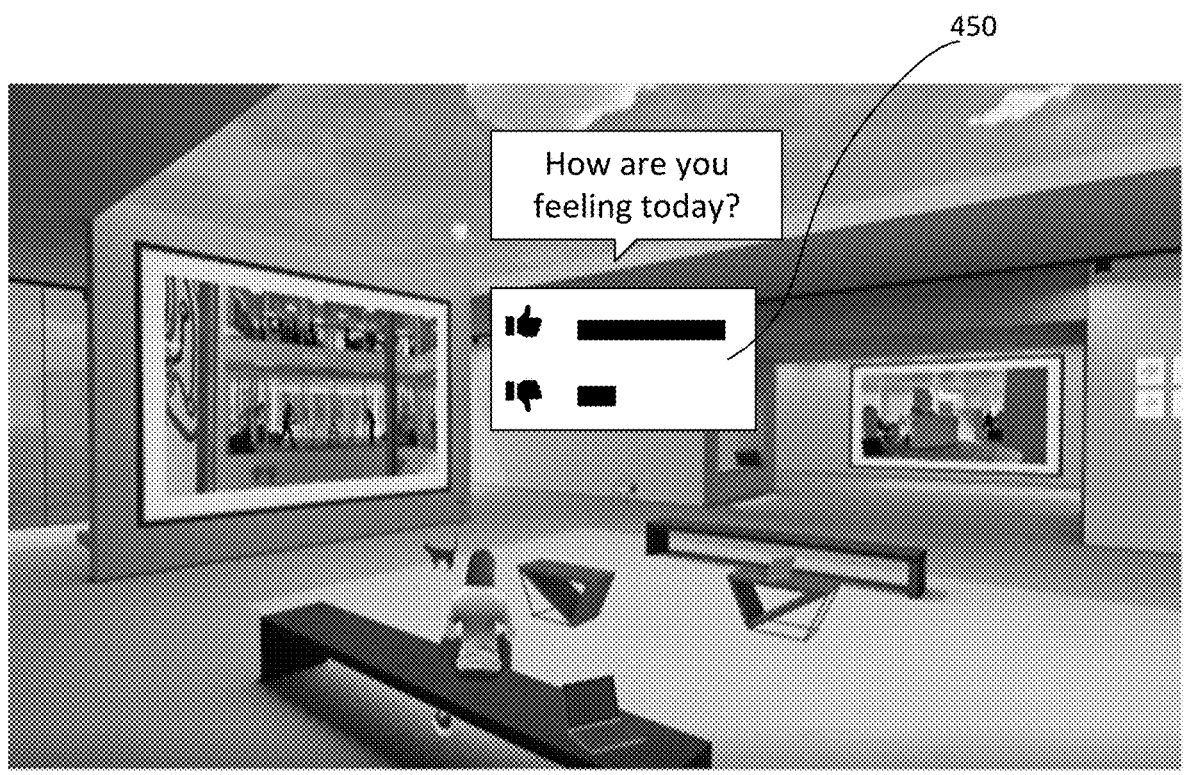
Figure 4H:
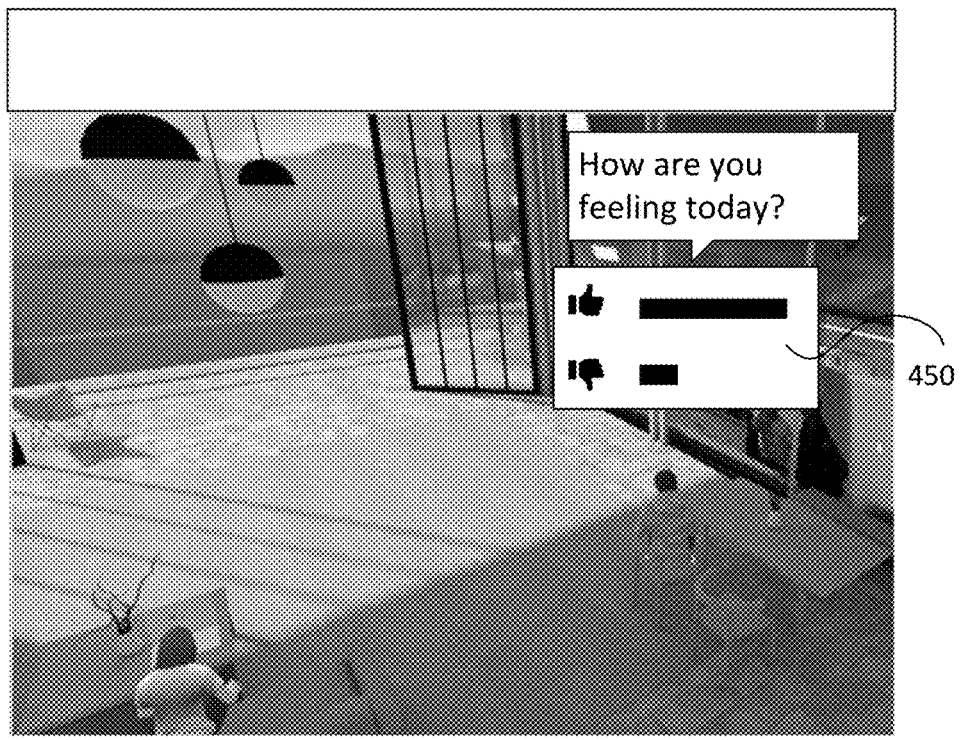

The results 450 of the user inputs collected through the mechanisms described above with reference to FIGS. 4E and 4F may be collated by the computing device 102 (e.g. by one of the collaboration channel creation modules 120) and included in one or both of the representations that are generated (by the modules 140, 142), e.g. as shown in FIGS. 4G and 4H.

In the example shown in FIG. 4A, each plane in the UI 400 corresponds to a plane of a display 104 in the physical space 106 and the planes in the UI 400 are oriented in the same way as the physical planes of the displays (e.g. perpendicular to each other in the example of FIGS. 4A and 4B).

The digital space (as shown in the representation generated in block 210) may correspond to a physical location within the physical space 106, although there is not a one-to-one relationship between the size of the digital space and its corresponding physical location since the size of the digital space varies according to the number of remote users represented by avatars in the digital space. In the plan view 410 in FIG. 4A, the digital space may correspond to an area 412 of the space 106 that is outside of the field of view of any of the cameras. In the physical space, this area 412 that is mapped to the digital space may be an area which does not contain any desks or work stations (for example it may be the lift shaft, stairwell, cupboards, etc.). As described above with reference to FIG. 3B, the size of the digital space changes according to the number of remote workers; however, the size of the area 412 in the physical space to which it is mapped does not change.

Mapping the digital space to a physical area of the physical space results in a more intuitive user interface and collaboration system. The displays 104 act as portals from the physical space 106 into the digital space and the windows 401-403 in a remote user's UI 400 act as portals from the digital space into the physical space 106.

Whilst in the example of FIGS. 4A and 4B the proximity parameter controls the field of view of the representation of the physical workplace that is output to, and hence received by, a particular computing device of a remote user, the representation may addition, or instead, be changed in different ways in response to the proximity parameter. For example, the volume of the audio may be changed in response to changes in the proximity parameter (e.g. increased in response to the proximity parameter increasing and decreased in response to the proximity parameter decreasing).

In the examples described above, the representation of the digital space (as generated in block 210 and updated in block 218) displays presence information for remote users (using presence information 204); however, the presence information for on-site users is not displayed within the representation of the physical space. In a variation of the examples described above, the presence information for an on-site user may be indicated as an overlay within the representation of the physical space by placing an icon 378 indicating an on-site user's status at or near the position of that on-site user's defined work station or desk (e.g. as defined within the user information 202), as shown in the example representation 380 in FIG. 3I. Alternatively, where the avatars of on-site users are used in the representation of the physical space, these may be changed to reflect the status of the on-site user in a corresponding manner to the avatars of the remote users (as described above with reference to FIG. 3E). In such examples, the method of FIG. 2 comprises dynamically updating the representation of the physical space in response to changes in presence information (block 220) in addition to, or instead of, updating the representation of the digital space in response to changes in presence information (block 218). In an example, the system may update both the representation of the digital space and the representation of the physical space. In another example, a user may configure which updates are performed (e.g. block 218 and/or block 220). As one example, presence information 204 may indicate that a status of a user is available, busy, do-not-disturb, away, be-right-back, or offline, and icon 378 may take forms that are graphically distinguishable in order to visually indicate each status.

The displays 104 within the physical space 106 may be static or mobile. Where the displays 104 are mobile, any change to their position will affect the representation of the physical space (e.g. because what is within the field of view of the camera 112) and may affect which of the computing devices 108A-D to which the representation is output (and hence which computing devices 108A-D receive the representation), e.g. where the change in position of the display 104 changes the set of remote user's that are associated with the display 104.

The communication channel provided using the systems and methods described herein may operate over long sessions. In an example, the representation of the digital space may be generated, updated and output at all times (or at all times when there is at least one remote user connected to the system that is associated with the particular display to which the representation is output) whereas the representation of the physical space may only be generated and output during predefined time periods, e.g. during predefined time periods (e.g. 7 am-7 pm) during the working week.

Figure 3J:
FIG. 3J shows the use of icons in both a representation of a digital space and a representation of a physical space.

The systems and methods described above may additionally provide a user interface to users (where on-site or remote) to add visual elements 382 (e.g. in the form of icons or text boxes) into the representations 384, 386 that are associated with their avatar or their specified desk location, as shown in FIG. 3J. In some examples the visual elements 382 may be added to indicate a user input (e.g. a response that was provided to a question) within the system, e.g. as described above with reference to FIGS. 4E and 4F. The system may also enable users to add visual elements into the representations that are associated with the avatar of another user or the specified desk location of another user. In such examples, the input data 200 to the method of FIG. 2 further comprises visual element data that specifies the visual element (based on user input) and links it to an avatar or position within the physical space 106. The method further comprises including the visual elements in the representations (in blocks 210, 212 and 218) at the defined position (e.g. proximate to the linked avatar or location). The visual element data may further define when the visual element is to be displayed (e.g. a time period for display).

Where visual elements are displayed within a representation, the system may further provide a user interface to users to enable them to interact with a visual element, e.g. to click on it to trigger a sound or animation or to add a further visual element (e.g. another icon or text box) to the initial visual element.

For video representations captured by a camera of the on-site users, the visual elements may be implemented in one or more layers superimposed over the representation of the physical space (which may be considered the base video) and/or in a dedicated pane or section of the display on the devoted to aggregations of digital objects (i.e. like a digital noticeboard/whiteboard/pinboard). A visual element comprises a file (e.g. an image, document etc.) rendered and interactively natively or iconic representations that, if clicked on, opened an interaction capability. The visual elements may be 2D or 3D representations. In various examples, the visual elements may be 3D objects or files rendered on to 3D objects, and interacted with in the same way as described above.

The provision of a user interface and the inclusion of visual elements in this way in the representations provides a further means of communication within the communication channel provided by the system.

Figure 5A:
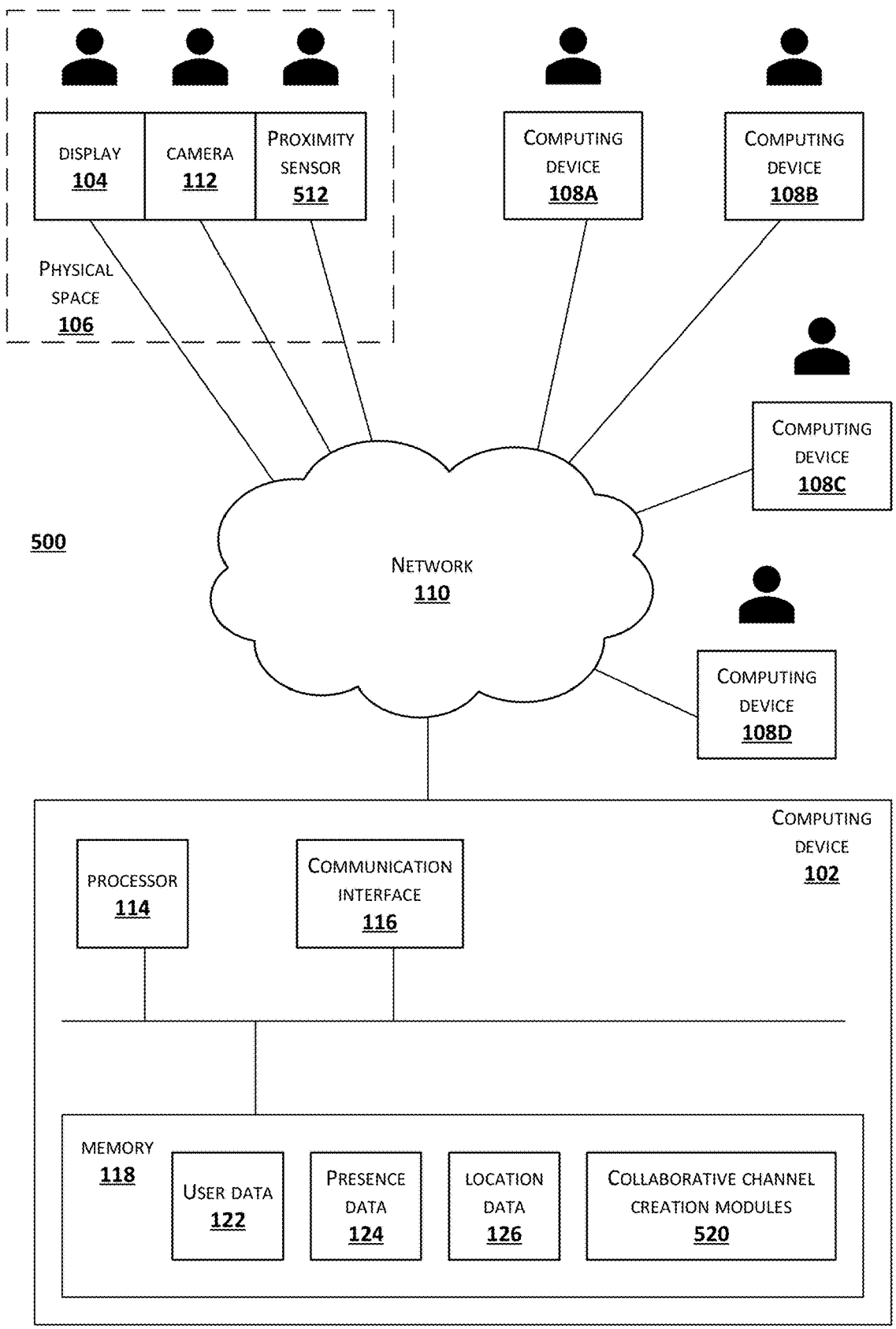
FIG. 5A is a schematic diagram showing a second example collaborative system.
Figure 5B:
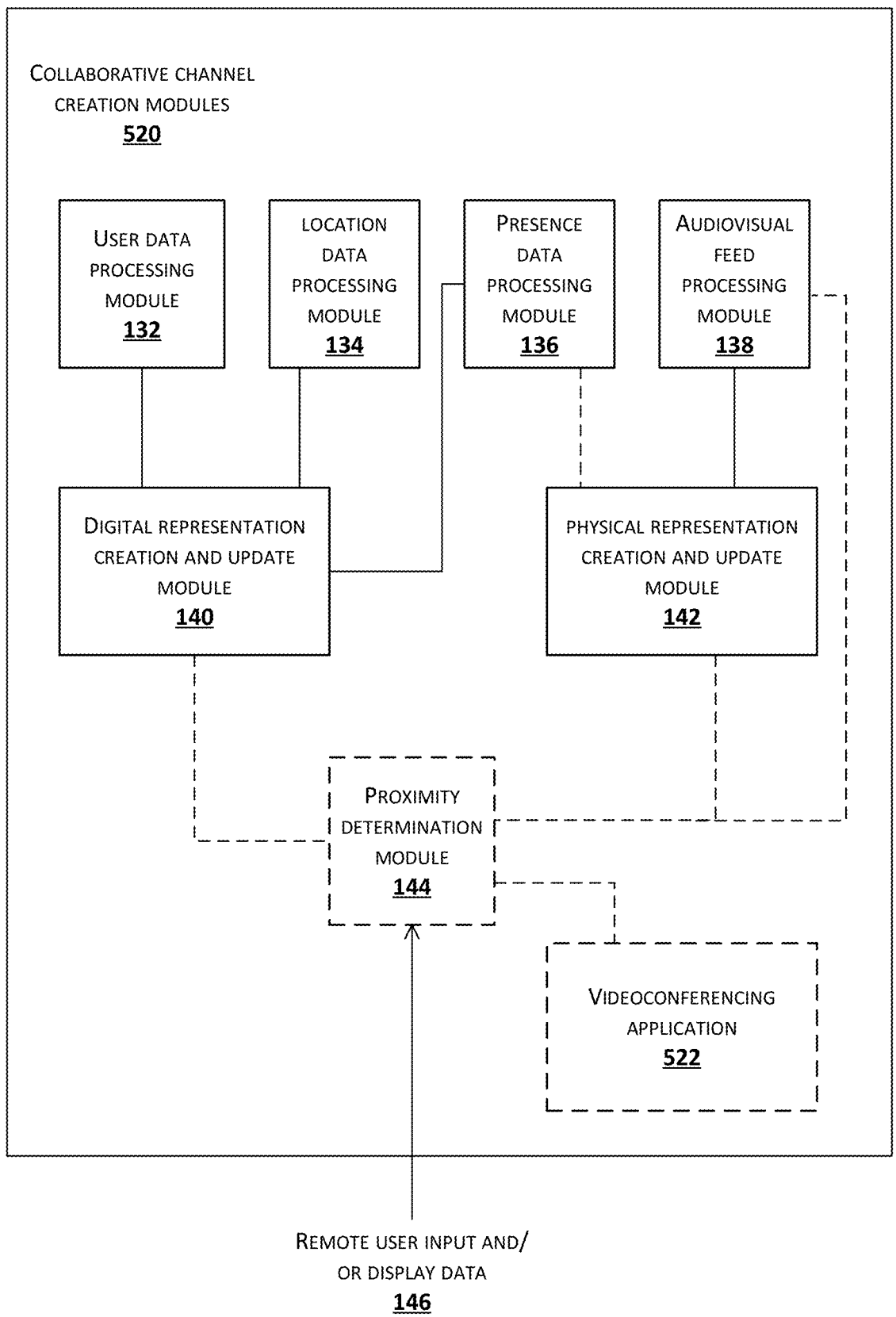
FIG. 5B shows elements of the system of FIG. 5A in more detail.

FIG. 5A is a schematic diagram showing a second example collaborative working system. The system 500 shown in FIG. 5A is a variation on that shown in FIG. 1A and described above. Compared to the system 100 shown in FIG. 1A, the system 500 shown in FIG. 5A additionally comprises a proximity sensor 512 that is configured to detect a person (i.e. an on-site user) in proximity to the display 104. This sensor 512 may be a LiDAR sensor or other type of proximity sensor. The sensor 512 may be a depth camera or where the camera 112 comprises a depth camera, the camera 112 may also act as the proximity sensor 512 and there may be no separate proximity sensor 512. The other difference between FIGS. 1A and 5A is the collaborative channel creation modules 520. The set of collaborative channel creation modules 520 are shown in more detail in FIG. 5B. They are similar to those shown in FIG. 1B. In a similar manner to the collaborative channel creation modules 120 shown in FIGS. 1, the collaborative channel creation modules 520 comprises computer executable instructions that, when executed by the one or more processors 114, cause the computing device 102 to implement the methods described herein (e.g. the method of FIG. 6). In addition to the modules shown in FIG. 1B and described above, the set of collaborative channel creation modules 520 additionally comprises a video conferencing application 522. As shown in FIG. 5B (and described below) the video conferencing application 522 may be triggered by an input from the proximity determination module 144.

Figure 6:
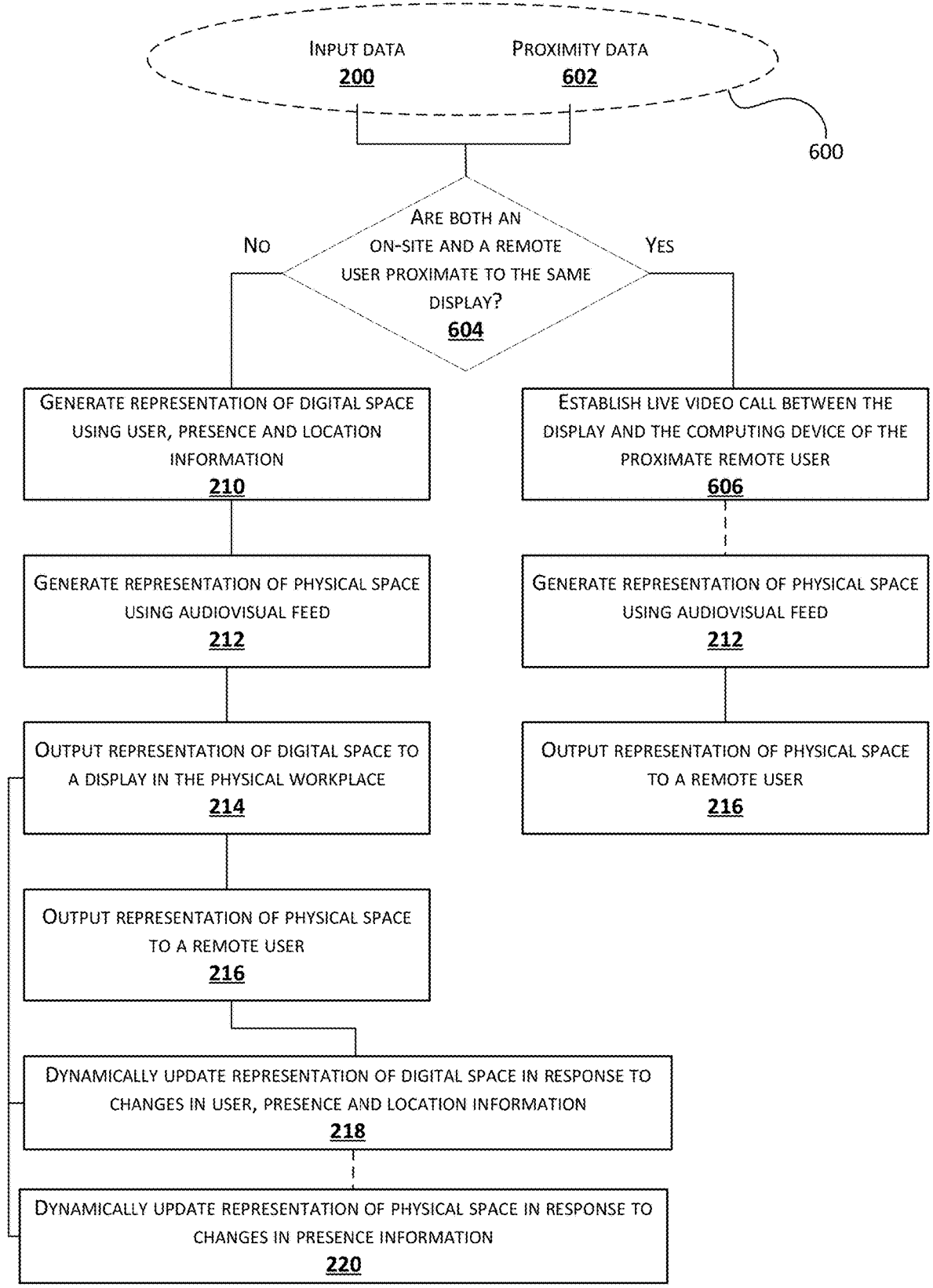
FIG. 6 is a flow diagram of a second example method of operating a collaborative system such as shown in FIG. 5A.

The system 500 of FIG. 5A has two different modes of operation as shown in the flow diagram in FIG. 6. FIG. 6 is a flow diagram of a second example method of operating a collaborative working system such as shown in FIG. 5A. As shown in FIG. 6, the inputs to the method are the input data 200 described above with reference to FIG. 2 and additionally proximity data 602 output by the proximity sensor 512 (or camera 112 where the camera functions as both a camera and a proximity sensor). Where the system comprises more than one display 104, the proximity data 602 may comprise proximity data for each display 104.

The system 500 switches between the two modes of operation based on proximity data in relation to both the physical space 106 and the digital space. The proximity data for the digital space comprises the proximity parameters for the computing devices 108A-D of the remote users. The proximity data for the physical space is the proximity data 602 that is generated by the proximity sensor 512 and received as an input. In the method of FIG. 6, each computing device 108A-D has an associated proximity parameter which may be set as detailed above (e.g. it may initially be set to a default value and then it may be changed based on the remote user's interaction with the representation of the physical space that is displayed on their computing device).

The system (e.g. the proximity determination module 144) determines whether both an on-site user and a remote user are proximate to the same display 104 (block 604) and switches between a first mode and a second mode of operation based on the outcome of the determination. A remote user is considered to be proximate to a display 104 if the remote user's computing device has a proximity parameter associated with the particular display that exceeds a threshold value, or otherwise meets predefined criteria for proximity. An on-site user is considered to be proximate to a display 104 if the proximity data 602 detects a person (i.e. an on-site user) physically proximate to the particular display 104, e.g. if the person is standing or sitting in front of, or otherwise close to, the display 104.

In response to determining that there is not both an on-site user and a remote user proximate to the same display ('No' in block 604), the system operates in the first mode of operation, as described above with reference to FIG. 2. In response to determining that there is both an on-site user and a remote user proximate to the same display ('Yes' in block 604), the system instead switches to operate in a second mode of operation.

In the second mode of operation, the computing device 102 establishes a live video call between the display 104 and the computing device of the proximate remote user (block 606) using the videoconferencing application 522. If there is more than one remote user that is proximate to the display 104, in addition to the on-site user proximate to the physical display 104, then the computing device 102 establishes a multi-way live video call between the display 104 and the computing devices of each proximate remove user (in block 606).

In the first mode of operation, the representation of the digital space that is rendered on the display 104 in the physical space does not include any audio and so establishing the live video call (in block 606) may comprise switching on (e.g. un-muting) speakers in (or near) the display 104 so that the on-site user can hear the remote user. Similarly, in the first mode of operation, the representation of the physical space either comprised no audio or processed audio that masked the content of any speech, whereas in the second mode of operation, the audio is passed to the computing device of the remote user in a form in which the speech can be heard. The display 104 may comprise a beamforming microphone which may be controlled by the computing device 102 to direct the beam at the proximate on-site user and hence reduce background noise that is detected. Where a live video call is established, other real-time interactions (in addition to speech and video) may be enabled, such as an interactive whiteboard.

When in the second mode of operation, the representation of the digital space is not output to the display 104 (block 214 is omitted) and hence the representation of the digital space may not be generated (e.g. block 210 may also be omitted). The representation of the physical space may still be generated (in block 212) and output (in block 216) to the computing devices of remote users associated with the display who are not proximate to the display 104 (i.e. where their proximity parameters do not meet the proximity criteria). As described above, the representation of the physical space may comprise no audio or processed audio such that whilst the representation will show the proximate on-site user, the content of the conversation in the live video call will not be audible.

In a variation of that shown in FIG. 6, the representation of the physical space may also not be output (block 216 may be omitted) and hence the representation of the physical space may not be generated (e.g. block 212 may also be omitted).

As described above, when switching from the first mode of operation to the second mode of operation, the images presented on the physical display 104 in the physical space 106 switch from comprising avatars of one or more remote users (e.g. as shown in FIGS. 3A, 3B and 3E) to a live video feed of one or more proximate remote users.

The system 500 may switch between modes of operation in response to changes in the proximity data (e.g. in response to analysis performed by the proximity determination module 144). When operating in the second mode and in response to detecting that the condition for switching to this second mode is no longer met (i.e. both an on-site user and a remote user are no longer proximate to the display because one or both have become less proximate), the system switches to the first mode of operation. Similarly, when operating in the first mode and in response to detecting that the condition for switching to the second mode is met, the system switches from the first mode of operation to the second mode of operation.

As described above, the computing devices 102, 108A-D shown in FIGS. 1A and 5A comprise one or more processors 114 which are microprocessors, controllers or any other suitable type of processors for processing computer executable instructions to control the operation of the device in order to implement the methods described herein (e.g. as shown in FIGS. 2 and 6). An example computing device 108A-D which may be used in the system of either FIG. 1A or FIG. 5A is shown in more detail in FIG. 1C. In some examples, for example where a system on a chip architecture is used, the processors 114 include one or more fixed function blocks (also referred to as accelerators) which implement a part of the method of establishing the collaborative communication channel in hardware (rather than software or firmware). Platform software comprising an operating system 150 or any other suitable platform software may be provided at the computing device 102, 108A-D to enable application software 152, such as the collaborative channel communication modules 120, 520 in the case of computing device 102 to be executed on the device or the collaborative channel client application 152 in the case of the remote computing devices 108A-D.

The computer executable instructions are provided using any computer-readable media that is accessible by the computing device 102, 108A-D. Computer-readable media includes, for example, computer storage media such as memory 118 and communications media. Computer storage media, such as memory 118, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 118) is shown within the computing device 102 it will be appreciated that the storage is, in some examples, distributed or located remotely and accessed via a network or other communication link (e.g. using the communication interface 116).

The computing device 102, 108A-D may also comprise an input/output controller 156 arranged to output display information to a local display device 158, distinct from the display 104 in the physical space (and not shown in FIGS. 1A and 5A) which may be separate from or integral to the computing device 102, 108A-D. The display information may provide a graphical user interface. The input/output controller 156 may also be arranged to receive and process input from one or more devices, such as a user input device 160 (e.g. a mouse, keyboard, camera, microphone or other sensor). In some examples the user input device detects voice input, user gestures or other user actions and provides a natural user interface (NUI). This user input may be used to configure and control the collaborative channel creation modules 120, 520. In an embodiment the display device 158 also acts as the user input device 160 if it is a touch sensitive display device. The input/output controller 156 may also output data to devices other than the display device 158 in some examples, e.g. a locally connected printing device.

Any of the input/output controller 156, display device 158 and the user input device 160 comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Although the present examples are described and illustrated herein as being implemented in a system as shown in FIGS. 1A and 5A, the system described is provided as an example and not a limitation. As those skilled in the art will appreciate, the present examples are suitable for application in a variety of different types of networked computing systems. For example, computing device 102 may be implemented as a distributed computing device rather than a single entity.

The following paragraphs set out a number of further examples. Aspects of these examples may be combined in any manner.

A first further example provides a computer-implemented method comprising: generating a representation of a digital space, wherein the representation is generated using user information identifying a remote user associated with a display located in a physical space and using presence information relating to the remote user and the digital representation comprising an avatar of the remote user; generating a representation of the physical space using an audiovisual feed received from a camera proximate to the display located in the physical space; outputting the representation of the digital space to the display located in the physical space; outputting the representation of the physical space to a computing device associated with the remote user; and dynamically updating the representation of the digital space and/or physical space in response to changes in the user information and presence information.

A second further example provides a system comprising: a computing device comprising a processor and computer storage memory having computer-executable instructions stored thereon which, when executed by the processor, implement a method comprising: generating a representation of a digital space, wherein the representation is generated using user information identifying a remote user associated with a display located in a physical space and presence information relating to the remote user and the digital representation comprising an avatar of the remote user; and; generating a representation of the physical space using an audiovisual feed received from a camera proximate to the display located in the physical space; outputting the representation of the digital space to the display located in the physical space; outputting the representation of the physical space to a computing device associated with the remote user; and dynamically updating the representation of the digital space and/or physical space in response to changes in the user information and presence information.

A third further example provides a method of operating a system, the method comprising: in a first mode of operation: generating a representation of a digital space, wherein the representation is generated using user information identifying a remote user associated with a display located in a physical space and using presence information relating to the remote user and the digital representation comprising an avatar of the remote user; generating a representation of the physical space using an audiovisual feed received from a camera proximate to the display located in the physical space; outputting the representation of the digital space to the display located in the physical space; outputting the representation of the physical space to a computing device associated with the remote user; and dynamically updating the representation of the digital space and/or physical space in response to changes in the user information and presence information, and in a second mode of operation: establishing a live video call between the display and the computing device associated with the remote user, and wherein the method further comprises: switching from the first mode of operation to the second mode of operation in response to detecting an on-site user in proximity to the display located in the physical space and that a proximity parameter of the computing device associated with the remote user satisfies predefined proximity criteria.

A fourth further example provides a computer-implemented method comprising: generating a representation of a digital space for display on a display located in a physical space, wherein the representation is generated using user information identifying remote users associated with the display and presence information for the remote users and the digital representation comprising avatars of the remote users associated with the display; generating a representation of the physical space using an audiovisual feed captured by a camera proximate to the display located in the physical space; outputting the representation of the digital space to the display located in the physical space; outputting the representation of the physical space to a computing device operated by a remote user associated with the display; and dynamically updating the representation of the digital space and/or physical space in response to changes in the user information and presence information.

A fifth further example provides a system comprising: a computing device comprising a processor and computer storage memory having computer-executable instructions stored thereon which, when executed by the processor, implement a method comprising: generating a representation of a digital space for display on a display located in a physical space, wherein the representation is generated using user information identifying remote users associated with the display and presence information for the remote users and the digital representation comprising avatars of the remote users associated with the display; and; generating a representation of the physical space using an audiovisual feed captured by a camera proximate to the display located in the physical space; outputting the representation of the digital space to the display located in the physical space; outputting the representation of the physical space to a computing device operated by a remote user associated with the display; and dynamically updating the representation of the digital space and/or physical space in response to changes in the user information and presence information.

A sixth further example provides a method of operating a system, the method comprising: in a first mode of operation: generating a representation of a digital space for display on a display located in a physical space, wherein the representation is generated using user information identifying remote users associated with the display and presence information for the remote users and the digital representation comprising avatars of the remote users associated with the display; generating a representation of the physical space using an audiovisual feed captured by a camera proximate to the display located in the physical space; outputting the representation of the digital space to the display located in the physical space; outputting the representation of the physical space to a computing device operated by a remote user associated with the display; and dynamically updating the representation of the digital space and/or physical space in response to changes in the user information and presence information, and in a second mode of operation: establishing a live video call between the display and the computing device operated by the remote user, and wherein the method further comprises: switching from the first mode of operation to the second mode of operation in response to detecting an on-site user in proximity to the display located in the physical space and that a proximity parameter for the computing device operated by the remote user satisfies predefined proximity criteria.

Additionally, any of the first to sixth further examples may further comprise any one or more of the following features (in any combination):

Wherein dynamically updating the representation of the digital space in response to changes in the user information and presence information comprises dynamically resizing the digital space in response changes in numbers of remote users associated with the display.

Wherein dynamically updating the representation of the digital space in response to changes in the user information and presence information comprises (or further comprises) dynamically updating the avatar of the remote user in response to a change in presence information relating to the remote user.

Wherein generating a representation of the physical space using an audiovisual feed received from a camera proximate to the display located in the physical space comprises (or further comprises) processing the audiovisual feed to (i) remove audio data or (ii) filter the audio data to remove a band of frequencies from the audio data.

Wherein generating a representation of the physical space using an audiovisual feed received from a camera proximate to the display located in the physical space comprises (or further comprises): analyzing the audiovisual feed to detect a user action; and in response to detecting a user action, adding a sound effect corresponding to the user action.

Wherein generating a representation of the physical space using an audiovisual feed received from a camera proximate to the display located in the physical space comprises (or further comprises) processing the audiovisual feed to replace a user detected in the audiovisual feed with an avatar.

Wherein generating a representation of the physical space using an audiovisual feed received from a camera proximate to the display located in the physical space comprises (or further comprises) processing the audiovisual feed to obscure a user detected in the audiovisual feed.

Wherein the method further comprises setting a proximity parameter of the computing device associated with the remote user.

Where the method comprises setting a proximity parameter of the computing device associated with the remote user, the method further comprises updating the proximity parameter of the computing device in response to detecting user interaction by the remote user with the representation of the physical space.

Where the method comprises setting a proximity parameter of the computing device associated with the remote user, generating a representation of the physical space using an audiovisual feed received from a camera proximate to the display located in the physical space comprises: generating a representation of the physical space using the audiovisual feed and the proximity parameter.

Where the method comprises setting a proximity parameter of the computing device associated with the remote user, generating a representation of the physical space using the audiovisual feed and the proximity parameter comprises (or further comprises) adjusting a field of view of the representation in response to the proximity parameter.

Where the method comprises setting a proximity parameter of the computing device associated with the remote user, generating a representation of the physical space using an audiovisual feed received from a camera proximate to the display located in the physical space comprises (or further comprises) generating a plurality of representations of the physical space using the audiovisual feed, each of the representations of the physical space corresponding to a different value of the proximity parameter, and wherein outputting the representation of the physical space to a computing device associated with the remote user comprises selecting one of the plurality of representations using the determined proximity parameter of the computing device and outputting the selected representation of the physical space to the computing device.

Where the method comprises setting a proximity parameter of the computing device associated with the remote user, the method further comprises: in response to detecting an on-site user in proximity to the display located in the physical space and that the proximity parameter of the computing device associated with the remote user satisfies predefined proximity criteria: stopping outputting both the representation of the digital space to the display and the representation of the space to the computing device associated with the remote user; and establishing a live video call between the display and the computing device associated with the remote user.

Wherein the method further comprises, in response to detecting an on-site user in proximity to the display located in the physical space and that the proximity parameter of the computing device associated with the remote user satisfies predefined proximity criteria: outputting the representation of the space to the computing device associated with a second remote user, wherein the user information identifies the second remote user as associated with the display located in the physical space and the proximity parameter of the computing device associated with the second remote user has a proximity parameter that does not satisfy the predefined proximity criteria.

Wherein the representation of the physical space generated using an audiovisual feed received from a camera proximate to the display located in the physical space is a first representation of the physical space and the method further comprises: generating a second representation of the physical space using an audiovisual feed received from a second camera proximate to a second display located in the physical space; and wherein outputting the representation of the physical space to a computing device associated with the remote user comprises: outputting a user interface to the computing device associated with the remote user, wherein the user interface comprises the first and second representations displayed in an orientation corresponding to a relative orientation of the display and the second display.

Wherein the system further comprises: the display located in the physical space; and a camera, proximate to the display and configured to generate the audiovisual feed.

Wherein the method further comprises setting a proximity parameter of the computing device associated with the remote user.

Wherein the method further comprises updating the proximity parameter of the computing device in response to detecting user interaction by the remote user with the representation of the physical space.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A computer-implemented method comprising:
generating a representation of a digital space, wherein the representation is generated using user information identifying a remote user associated with a display located in a physical space and using presence information relating to the remote user and the digital representation comprising an avatar of the remote user;
generating a representation of the physical space using an audiovisual feed received from a camera proximate to the display located in the physical space, wherein the representation of the physical space is a first representation of the physical space;
outputting the representation of the digital space to the display located in the physical space;
outputting the representation of the physical space to a user interface of a computing device associated with the remote user;
dynamically updating the representation of the digital space and/or physical space in response to changes in the user information and presence information;
generating a second representation of the physical space using an audiovisual feed received from a second camera proximate to a second display located in the physical space; and
outputting the first and second representations of the physical space to the computing device associated with the remote user, wherein the user interface comprises the first and second representations displayed in an orientation corresponding to a relative orientation of the display and the second display.

2. The method according to claim 1, wherein dynamically updating the representation of the digital space in response to changes in the user information and presence information comprises dynamically resizing the digital space in response to changes in numbers of remote users associated with the display.

3. The method according to claim 1, wherein dynamically updating the representation of the digital space in response to changes in the user information and presence information comprises dynamically updating the avatar of the remote user in response to a change in presence information relating to the remote user.

4. The method according to claim 1, wherein generating the representation of the physical space using the audiovisual feed received from the camera proximate to the display located in the physical space comprises processing the audiovisual feed to (i) remove audio data or (ii) filter the audio data to remove a band of frequencies from the audio data.

5. The method according to claim 1, wherein generating the representation of the physical space using the audiovisual feed received from the camera proximate to the display located in the physical space comprises:
analyzing the audiovisual feed to detect a user action; and
in response to detecting a user action, adding a sound effect corresponding to the user action.

6. The method according to claim 1, wherein generating the representation of the physical space using the audiovisual feed received from the camera proximate to the display located in the physical space comprises processing the audiovisual feed to replace a user detected in the audiovisual feed with an avatar.

7. The method according to claim 1, wherein generating the representation of the physical space using the audiovisual feed received from the camera proximate to the display located in the physical space comprises processing the audiovisual feed to obscure a user detected in the audiovisual feed.

8. The method according to claim 1, further comprising setting a proximity parameter of the computing device associated with the remote user.

9. The method according to claim 8, further comprising updating the proximity parameter of the computing device in response to detecting user interaction by the remote user with the representation of the physical space.

10. The method according to claim 8, wherein generating the representation of the physical space using the audiovisual feed received from the camera proximate to the display located in the physical space comprises:
generating the representation of the physical space using the audiovisual feed and the proximity parameter.

11. The method of claim 8, wherein generating the representation of the physical space using the audiovisual feed and the proximity parameter comprises adjusting a field of view of the representation in response to the proximity parameter.

12. The method according to claim 8, wherein generating the representation of the physical space using the audiovisual feed received from the camera proximate to the display located in the physical space comprises generating a plurality of representations of the physical space using the audiovisual feed, each of the representations of the physical space corresponding to a different value of the proximity parameter, and
wherein outputting the representation of the physical space to the computing device associated with the remote user comprises selecting one of the plurality of representations using the determined proximity parameter of the computing device and outputting the selected representation of the physical space to the computing device.

13. The method according to claim 8, further comprising:
in response to detecting an on-site user in proximity to the display located in the physical space and that the proximity parameter of the computing device associated with the remote user satisfies predefined proximity criteria:
stopping outputting both the representation of the digital space to the display and the representation of the physical space to the computing device associated with the remote user; and
establishing a live video call between the display and the computing device associated with the remote user.

14. The method according to claim 13, further comprising, in response to detecting the on-site user in proximity to the display located in the physical space and that the proximity parameter of the computing device associated with the remote user satisfies predefined proximity criteria:
outputting the representation of the digital space to a second computing device associated with a second remote user, wherein the user information identifies the second remote user as associated with the display located in the physical space and the proximity parameter of the second computing device associated with the second remote user does not satisfy the predefined proximity criteria.

15. A system comprising:
a computing device comprising a processor and computer storage memory having computer-executable instructions stored thereon which, when executed by the processor, implement a method comprising:
generating a representation of a digital space, wherein the representation is generated using user information identifying a remote user associated with a display located in a physical space and presence information relating to the remote user and the digital representation comprising an avatar of the remote user; and
generating a representation of the physical space using an audiovisual feed received from a camera proximate to the display located in the physical space, wherein the representation of the physical space is a first representation of the physical space;
outputting the representation of the digital space to the display located in the physical space;
outputting the representation of the physical space to a user interface of a computing device associated with the remote user;
dynamically updating the representation of the digital space and/or physical space in response to changes in the user information and presence information;
generating a second representation of the physical space using an audiovisual feed received from a second camera proximate to a second display located in the physical space; and
outputting the first and second representations of the physical space to the computing device associated with the remote user, wherein the user interface comprises the first and second representations displayed in an orientation corresponding to a relative orientation of the display and the second display.

16. The system according to claim 15, further comprising:
the display located in the physical space; and the camera proximate to the display, wherein the camera is configured to generate the audiovisual feed.

17. A method of operating a system, the method comprising:
in a first mode of operation:
generating a representation of a digital space, wherein the representation is generated using user information identifying a remote user associated with a display located in a physical space and using presence information relating to the remote user and the digital representation comprising an avatar of the remote user;
generating a representation of the physical space using an audiovisual feed received from a camera proximate to the display located in the physical space, wherein the representation of the physical space is a first representation of the physical space;
outputting the representation of the digital space to the display located in the physical space;
outputting the representation of the physical space to a user interface of a computing device associated with the remote user;
dynamically updating the representation of the digital space and/or physical space in response to changes in the user information and presence information;
generating a second representation of the physical space using an audiovisual feed received from a second camera proximate to a second display located in the physical space; and
outputting the first and second representations of the physical space to the computing device associated with the remote user, wherein the user interface comprises the first and second representations displayed in an orientation corresponding to a relative orientation of the display and the second display,
and in a second mode of operation:
establishing a live video call between the display and the computing device associated with the remote user,
and wherein the method further comprises:
switching from the first mode of operation to the second mode of operation in response to detecting an on-site user in proximity to the display located in the physical space and detecting that a proximity parameter of the computing device associated with the remote user satisfies predefined proximity criteria.

18. The method according to claim 17, further comprising setting the proximity parameter of the computing device associated with the remote user.

19. The method according to claim 18, further comprising updating the proximity parameter of the computing device in response to detecting user interaction by the remote user with the representation of the physical space.

\* \* \* \* \*